United States Patent [19]

Lewis et al.

[11] Patent Number: 5,347,190
[45] Date of Patent: Sep. 13, 1994

[54] MAGNETIC BEARING SYSTEMS

[75] Inventors: David W. Lewis; Robert R. Humphris; Eric H. Maslen; Paul E. Allaire; Ronald D. Williams; Steven W. Yates, all of Charlottesville, Va.

[73] Assignee: University of Virginia Patent Foundation, Charlottesville, Va.

[21] Appl. No.: 562,339

[22] Filed: Aug. 3, 1990

Related U.S. Application Data

[63] Continuation-in-part of Ser. No. 359,772, May 31, 1989, abandoned, which is a continuation-in-part of Ser. No. 242,264, Sep. 9, 1988, abandoned.

[51] Int. Cl.⁵ .................................................. H02K 7/09
[52] U.S. Cl. ................................... 310/90.5; 310/68 B
[58] Field of Search .................... 310/90.5, 51, 68 B; 318/254, 607, 625; 234/208; 324/207.25

[56] References Cited

U.S. PATENT DOCUMENTS 3,937,533  2/1976  Veillette ............................. 310/90.5
4,180,946  1/1980  Heijkensjold ....................... 310/90.5
4,841,184  6/1989  Chen et al. .......................... 310/90.5

OTHER PUBLICATIONS

Appendix B, Fault Tolerant Magnetic Controller.
"Fault Tolerant Multiprocessor Digital Control System Design For Active Magnetic Bearings", S. W. Yates et al., University of Virginia, Jun. 1988, Charlottesville, Va., pp. 1–177.
Diagnostic and Control Features With Magnetic Bearings by R. R. Humphris et al.; Univ. of Virginia,Charlottesville, Va. 22901; presented at IECEC Conf. Aug. 6–11, 1989, Crystal City, Va.; pp. 1–8.

Primary Examiner—R. Skudy
Attorney, Agent, or Firm—Finnegan, Henderson, Farabow, Garrett and Dunner

[57] ABSTRACT

A magnetic bearing system includes a rotor with a plurality of masses distributed along the shaft including a portion having a circular peripheral surface suspended radially from pole pieces of permanent and electromagnets. A fault tolerant adaptive system responds to detected parameters of the rotor for varying the stiffness and damping the rotor. Position and speed of rotor are sampled at a rapid rate for each of a plurality of control axes and are processed independently during each sampling period. Malfunction of any of the processors causes supervisory controller to reconfigure the processing of the samples.

30 Claims, 24 Drawing Sheets

| Address | Content |
|---|---|
| 0000–0005 | ON-CHIP MEMORY-MAPPED REGISTERS |
| 0006–005F | RESERVED |
| 0060–007F | ON-CHIP BLOCK B2 |
| 0080–01FF | RESERVED |
| 0200–02FF | ON-CHIP BLOCK B0 (188) |
| 0300–03FF | ON-CHIP BLOCK B1 |
| 0400–1FFF | EXTERNAL DATA RAM (180) |
| 2000 | TIMER CONTROL REGISTER (182) |
| 2001 | TIMER 0 COUNT |
| 2002 | TIMER 1 COUNT (184) |
| 2003 | TIMER 2 COUNT |
| 2004–3FFF | TIMER REGISTERS APPEAR REPEATEDLY IN THIS SPACE |
| 4000–FFFF | UNUSED |

*Figure 7*

I/O PORT ADDRESS

| Register | Address |
|---|---|
| A/D START | 0 |
| A/D READ | 1 |
| D/A OUTPUT | 2 |
| SHIFT REGISTER 0 READ | 3 |
| SHIFT REGISTER 1 READ | 4 |
| SHIFT REGISTER 2 READ | 5 |
| SHIFT REGISTER 3 READ | 6 |
| SHIFT REGISTER 4 READ | 7 |
| SHIFT REGISTER 5 READ | 8 |
| CSR SELECT | 9 |
| SET FAIL BIT OF CSR | A |
| SERIAL OUTPUT | B |
| UNUSED | C–F |

*Figure 11*

PARALLEL SELF-TEST LOOP

MAIN OPERATION LOOP

MAGNETIC BEARING SYSTEMS

This is a continuation-in-part of U.S. patent application Ser. No. 07/359,772 now abandoned, filed May 31, 1989, which is a continuation-in-part of U.S. patent application Ser. No. 07/242,264 now abandoned, filed Sep. 9, 1988, the entire disclosure of which are relied upon and incorporated by reference herein.

BACKGROUND OF INVENTION

The present invention relates to magnetic bearings; wherein the stator and rotor are separated from each other by magnetic flux fields that attract the rotor to the stator in both the radial and axial directions; and more particularly, to a magnetic bearing system and related methods.

In any rotating machine, the turning elements, otherwise defined as rotors, are physically separated from the non-turning or stationary elements, sometimes referred to as stators, to prevent damage of the rotors or the stators. This separation is accomplished by use of bearings which may act in a radial direction, that is perpendicular to the essential axis about which turning occurs, and also in the axial direction, that is along the axis about which turning occurs.

Machinery characteristics come in part from the balance of the rotors, but even when a rotor is brought into perfect balance, other dynamic characteristics may still produce undesirable running characteristics. These latter characteristics stem from the dynamics of the system which may be described in terms of the masses and their distributions, damping properties of the materials of construction, configurations of the design, and the stiffnesses of the various components and their interactions. Included in these above-noted parameters are the bearings that support the rotating elements, which rotating elements taken together may be simply referred to as the rotor.

Rotating machines, such as pumps and compressors for example, display operating characteristics which come in part from such bearing parameters. With the use of magnetic bearings, these parameters may be controlled or modified as the rotor is stationary or turning. In general, conventional fluid film bearings or so-called anti-friction bearings, cannot be adjusted or modified either when the rotor is stationary, nor when it is turning in the bearings. So magnetic bearings offer many advantages over the more conventional bearings.

For example, by varying the defining parameters of the bearings, the overall system dynamics may be controlled. With magnetic bearings, these parameters may be adjusted or changed when the rotors are running (i.e., turning with the bearings) or even when they are in support but not turning. It is important to understand that support is not usually attained in a fluid film bearing until the rotor is turning. Such is not the case with the magnetic bearing; it may be in support whether the rotor is turning or not.

The basic elements of a rotating machine are noted in FIG. 1. The rotor includes a multiplicity of masses distributed along a flexible shaft, or in some designs, the flexible shaft is replaced by a series of equivalent rings or cylinders that connect the masses to one another. The individual magnetic bearings are arranged to carry either radial loads or axial loads or both and are attached to the stator or what is frequently called the frame or housing of the machine. In addition, most designs call for some type of back-up bearing that comes into service when the rotor is not turning and the magnetic bearings are not activated or in the situation in which the rotor motion becomes large and contact is likely to occur between the rotor and stator. "Large" motion means a few thousands of an inch as the space or clearance between the face of a magnetic bearing, which is attached to the housing, and the rotor element adjacent to the face is typically a few thousandths of an inch and contact between these two areas is not desirable.

Magnetic bearing systems may be used in applications where the control system will be expected to perform correctly for years without failure. Further, because of close tolerances and the desirability of using magnetic bearings for high speed apparatus, it is important that such a system provide for smooth operation at higher and higher critical speeds.

Multiprocessors offer many desirable properties such as significant system throughput; and the potential for fault tolerant performance. The incorporation of fault tolerance in multiprocessors is typically accomplished through the inclusion of fault detection and location routines and redundant processing modules. As advances in VLSI component technology allow processor performance to increase with corresponding reductions in cost, size, and power consumption, multiprocessor systems will be much more widely used because of their inherent advantages.

Unfortunately, the benefits associated with multiprocessor architectures are not easily attained because the partitioning of general computing tasks is quite a difficult problem [1]. In general, extraction of the parallel components of most algorithms is very difficult. Also, once an algorithm has been converted to a parallel form, optimal assignment of processing elements is difficult. Finally, fault-tolerant systems that employ software intensive fault detection, location, and recovery techniques can spend a significant amount of processing time executing self-diagnostic routines. In real-time systems, this overhead may reduce system throughput to an unacceptable level.

SUMMARY OF THE INVENTION

One of the advantages of the present invention is the provision of a magnetic bearing system that is fault-tolerant, relatively economical to construct, provides support for higher critical speeds, and has low power requirements.

Another advantage of the present invention is the provision of a magnetic bearing system that can monitor its own operation.

Another advantage of the present invention is the provision of a magnetic bearing system that is capable of being balanced while the rotor is either stationary or in motion.

Another advantage of the present invention is the provision of a magnetic bearing system that is capable of predicting the overall dynamic response of a magnetically suspended rotor to any particular type of excitation to which the rotor may be subjected during rotation.

Another advantage of the present invention is the provision of a magnetic bearing system and method that minimizes vibration during operation, particularly at critical speeds.

Additional objects and advantages of the present invention will be set forth in part in the description which follows and will be obvious from the description, or may be learned by practice of the invention. The advantage of the invention may be realized and obtained by means of the instrumentalities and combinations particularly pointed out in the appended claims.

To achieve the advantages and in accordance with the purpose of the invention, as embodied and broadly described herein, the magnetic bearing system of the present invention comprises a housing; an axially extending rotor having a circular peripheral face portion; a plurality of magnet means, each constituting an axis of control, mounted to the housing, and having pole pieces angularly disposed and opposing the peripheral face portion for suspending the rotor radially from the pole pieces, said suspension having stiffness and damping characteristics in accordance with a control signal that varies the respective flux strength of the plurality of magnet means; sensing means for detecting selected parameters of the rotor; a control processor for each axis of control, each processor including means for sampling the detected parameters at a selected rate and for outputting the control signal in accordance with and corresponding to the detected samples; the control processors are interconnected for providing each processor with the sampled parameters and output control signals of the other processors; and a supervisory controller including means governed by the operation of the plurality of control processors for reconfigurating the plurality of control processors among the control axes at times when one of the control processors malfunctions.

In another aspect, the present invention comprises a method of controlling the rotor parameters in a magnetic bearing having a plurality of magnets angularly disposed and opposing a peripheral circular face portion of the rotor, wherein the rotor is radially suspended in accordance with the flux strength of the plurality of magnets, and wherein each of the plurality of magnets constitutes a control axis for the rotor, the method comprising sensing selected parameters of the rotor; sampling the selected parameters at a predetermined rate, processing the sampled parameters separately for each control axis to provide a corresponding output control signal for a respective control axis; communicating the sampled parameter and output control signals for each control axis to the other control axes; and combining the processing of more than one axis in response to the sampled parameters for calculating the output signals at times when the processing for one of the control axes malfunctions.

The accompanying drawings, which are incorporated in and constitute a part of this specification, illustrate preferred embodiments of the invention and together with the description, serve to explain the principles of the invention.

BRIEF DESCRIPTION OF THE DRAWINGS

FIG. 7. is a digital control module data memory map;

FIG. 11 is a digital controller module input/output space map;

FIGS. 26A, and 25B are graphical representations of amplitude response at horizontal outboard to rotating force field applied to stationary rotor and normal runup forces, for proportional and derivative gains=2.0;

GENERAL OVERVIEW

The following is a general discussion of various features of the system of the present invention.

Figure 2:
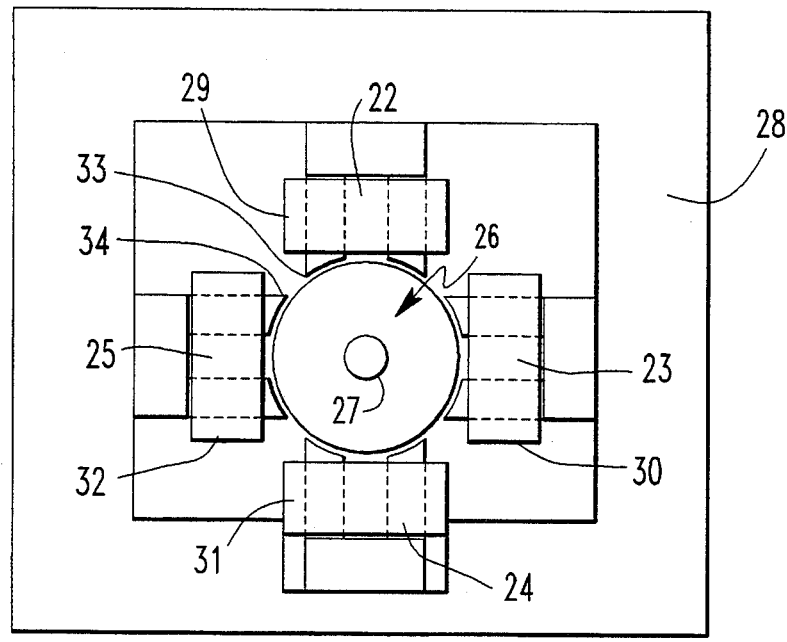
FIG. 2 is a sectional view taken across the axis of a rotor showing one form of magnetic bearing.

The use of the controls for the magnetic bearing in a manner additional to that of just supporting of the rotor provides for superimposing a rotating field on the otherwise controlled field used to support the rotor. FIG. 2 shows an end view of the rotor, i.e., looking axially along the geometric axis of the rotor. In FIG. 2, four magnets are depicted as composing the radial magnetic bearing although the number may be three or more magnets (see FIG. 4) depending upon the application and the control circuit employed. By superimposing a small field that sequentially moves from magnet 22 to 23 to 24 to 25 and then repeats itself, and by detecting the small motion that results from this rotating field through the bearing sensors, certain information may be deduced about the rotor. Specifically, the influence coefficients may be determined, which are mathematical quantities useful for understanding and predicting the dynamic behavior of the rotor. In addition, the rotor may be balanced from the measurements of this response to a rotating field, without the rotor turning. This is to say that the rotor may be brought into support through the use of the magnetic bearings, then the rotating field superimposed on the support field, and the unbalance of the rotor ascertained from the mathematical manipulation of the results of this rotating field and the response as detected by the bearing sensors.

Figure 3:
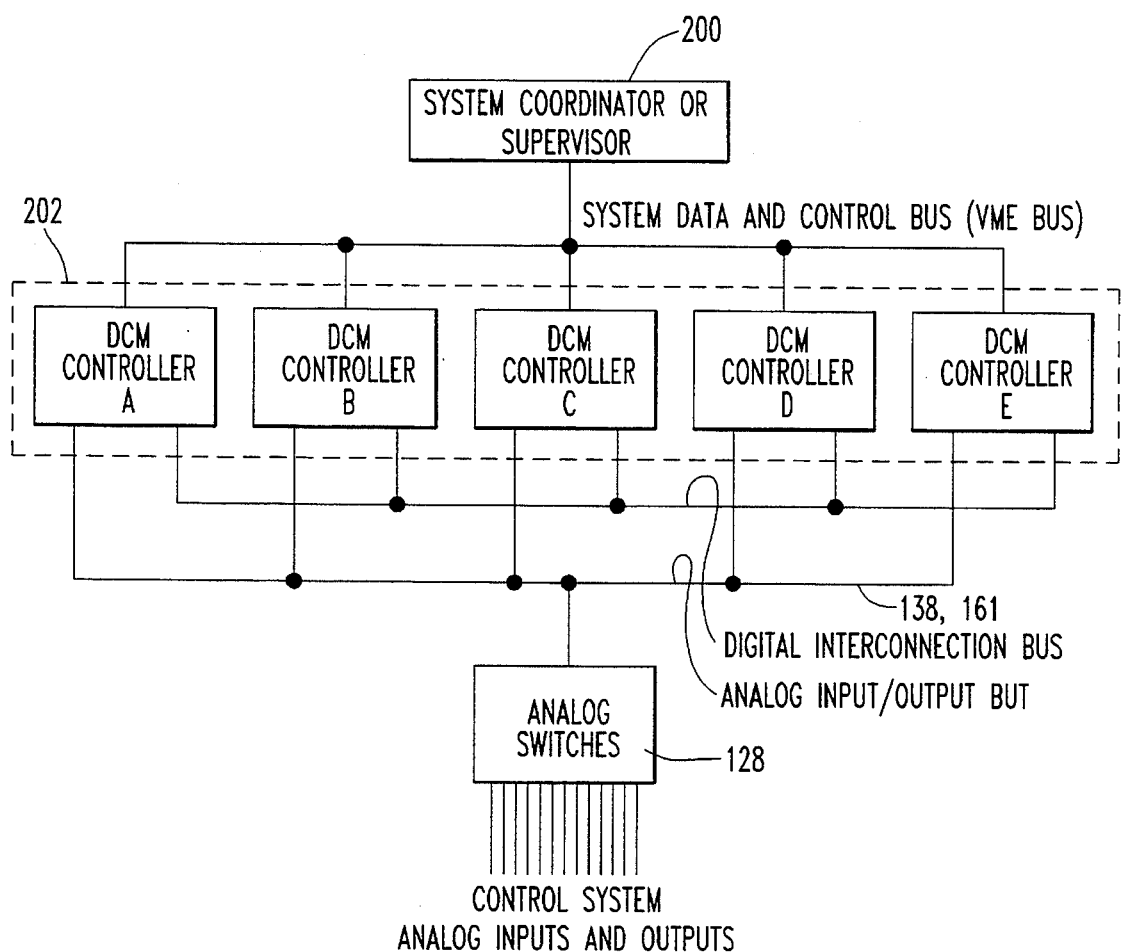
FIG. 3 is a block diagram illustrating a control computer system.

A controller for the magnetic bearing is organized with a system coordination or supervisory level 200 and a direct control level 202 as illustrated in FIG. 3. Significant mathematical computations can be required to provide sophisticated control for each bearing axis acting individually or coacting one with another through the use of a control algorithm. Through this means state space implementation is possible or other forms of multiple-input multiple-output control means are implementable. Some coordination of the individual axis controls is also needed, but much of this coordination can be accomplished on a much longer time scale than that which is required for direct axis control. This coordination is accomplished at the system coordination or supervisor level controller indicated by block 200 of FIG. 3. The nature of the operations performed at this level are less predictable and less computationally intense (when computation time is considered) so it is practical to use a general purpose processor at this level. It may be desirable to include more than one supervisory processor to permit the distribution of control tasks and to allow replacement of failed processors.

The two levels of control and the multiple processors at each level are included in this architecture because of the computational capacity requirements of the general magnetic bearing control problem. However, the inclusion of these multiple levels and multiple processors on each level offers a level of redundancy which can be of value to provide some degree of fault-tolerance.

Figure 17:
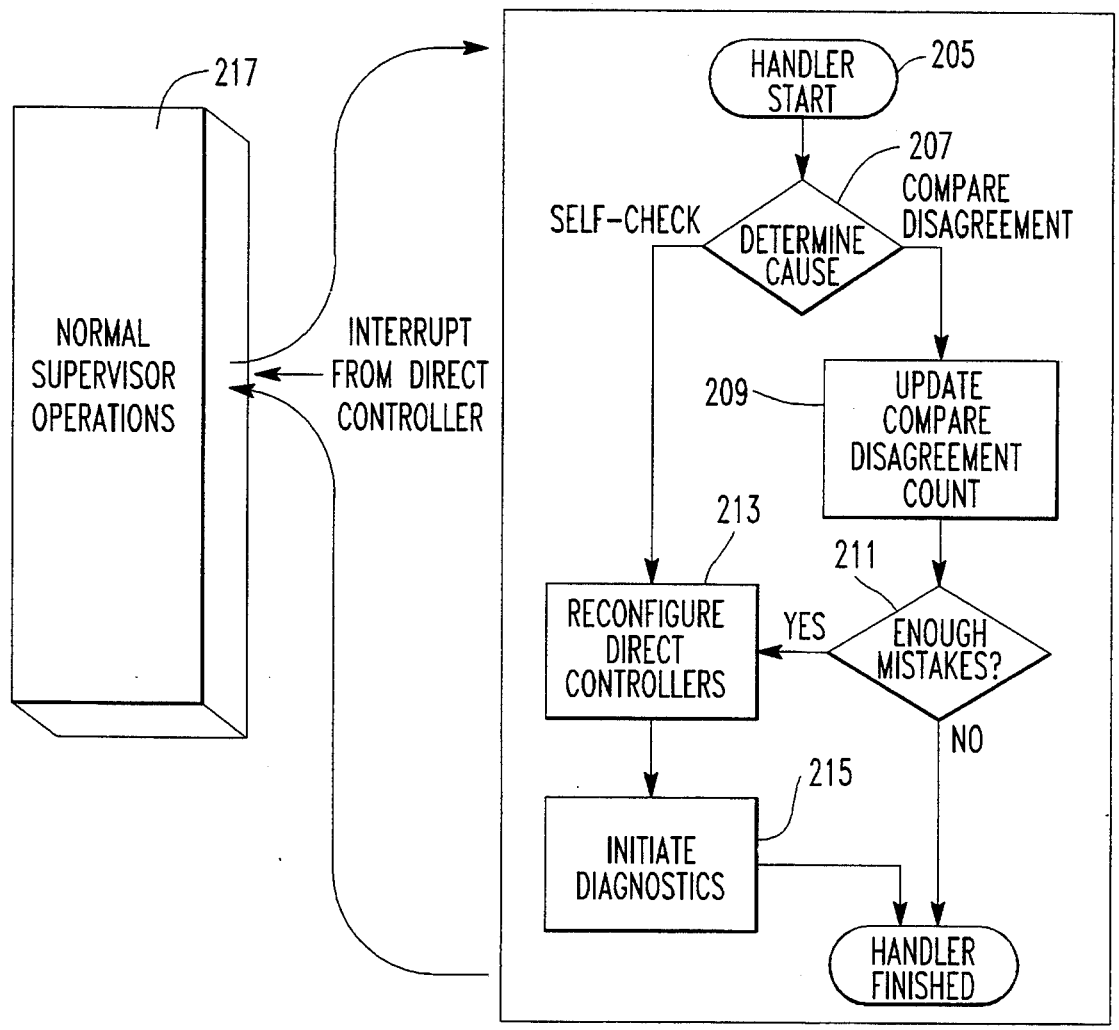
FIG. 17 is a flow chart illustrating supervisor response to a problem interrupt from a DCM in accordance with the present invention.

As evident from the flowchart of FIG. 17, and as is described in more detail hereinafter; upon a problem interrupt from a direct controller, the routine starts as indicated at Handler Start 205, and the cause of the problem is determined and the disagreement is compared at step 207. This comparison is updated and counted at step 209. When a predetermined number of errors are determined at step 211, the direct controllers are reconfigured at step 213 and diagnostics are initiated at step 215 before returning to normal supervisor operations at step 217.

Figure 14:
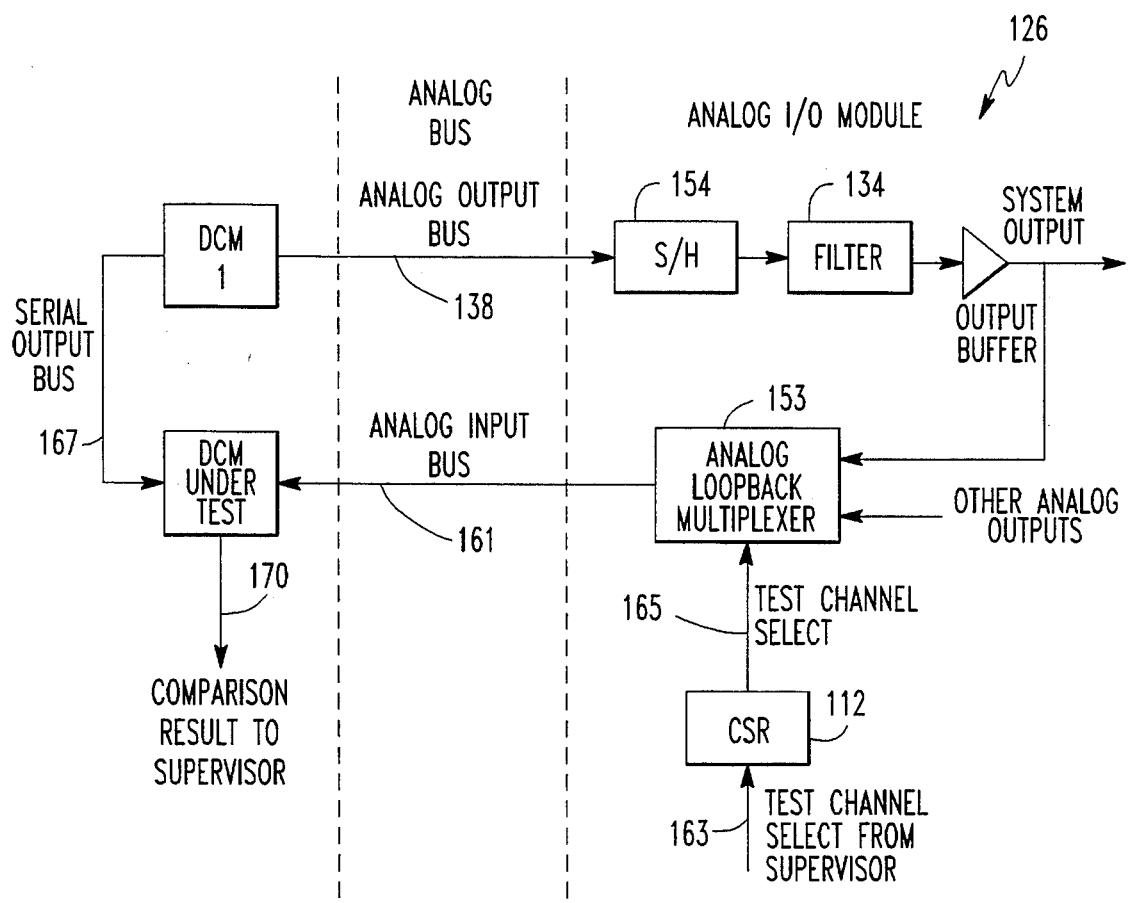
FIG. 14 is a block diagram illustrating the analog loop-back testing method of the system of the present invention.
Figure 18:
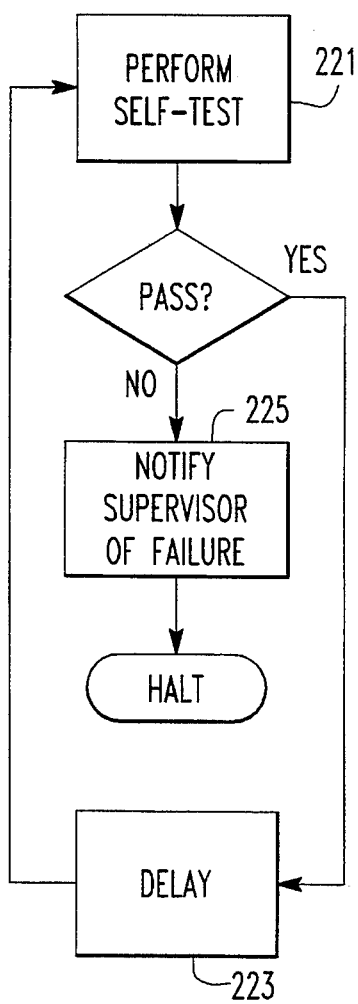
FIG. 18 is a flow chart illustrating a parallel self-test loop for a DCM in accordance with the present invention.
Figure 19:
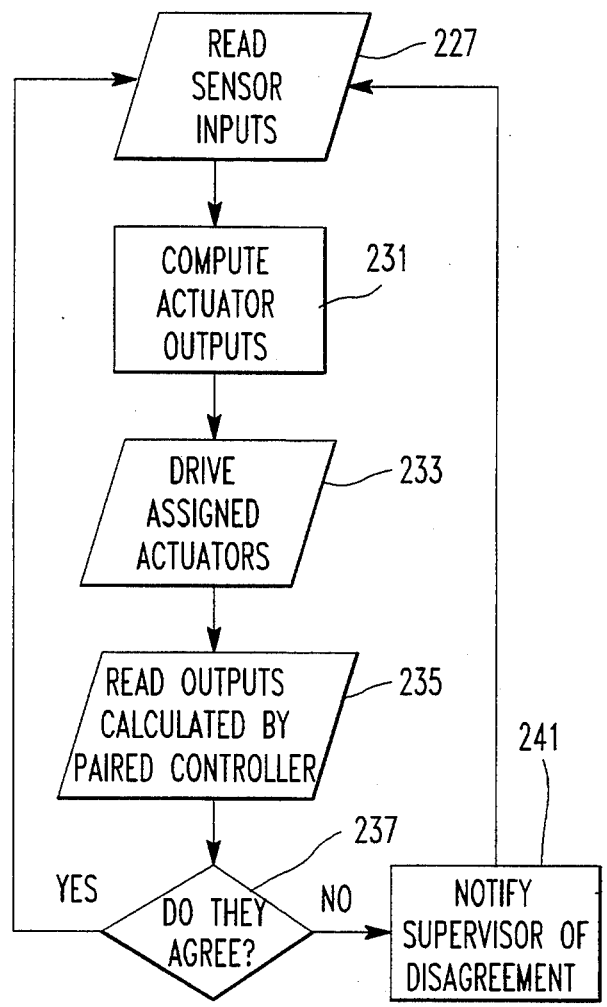
FIG. 19 is a flow chart illustrating the main operation loop for the DCM's in accordance with the present invention.

Referring to FIG. 18, the self-check or self test is performed at step 221. If it passes the test, it is delayed at step 223 prior to repeating the performance. If the self-test is not passed, the supervisor controller is notified at step 225, and the routine halted. Referring to FIG. 19, the bearing sensor inputs are read as noted at step 227 and actuator outputs are computed at step 231. The assigned actuators are driven at step 233 and the outputs are calculated and compared at step 235 as shown in FIG. 14. If they do not agree as indicated by step 237, the supervisor is notified of the disagreement at block 241, and the routine of FIG. 17 is commenced.

Figure 12:
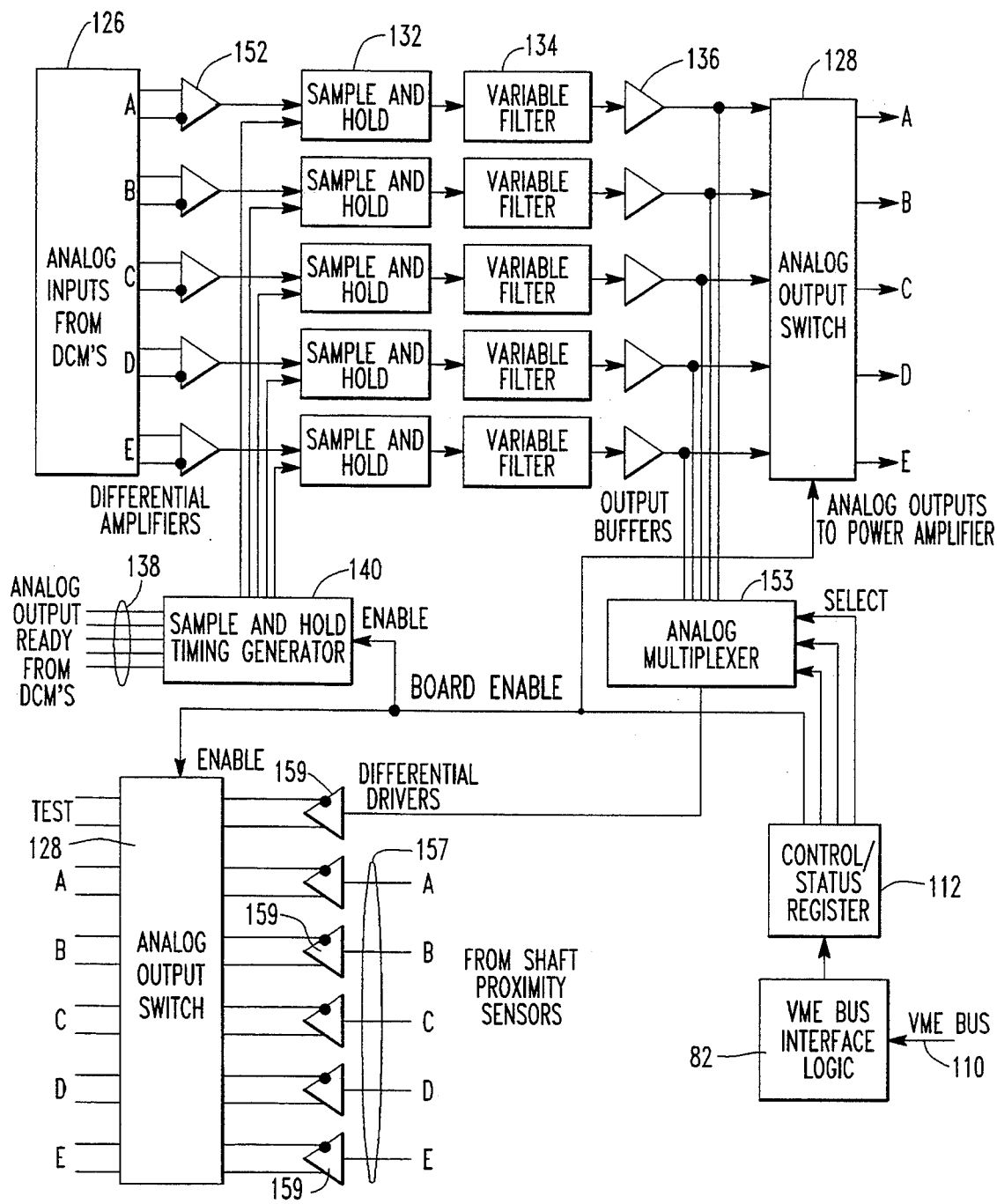
FIG. 12 is a schematic block diagram of an analog input/output module structure for the system for the present invention.

This architecture is intended to provide very general support for a range of magnetic bearing control algorithms and approaches. It is reasonable to expect that this controller will be used for some form of "state-space" control. To accomplish this type of control, it is necessary for the sensor inputs and actuator outputs to be available to more than one of the direct digital controllers. This allocation of inputs and outputs must therefore either be always available to all direct controllers or the supervisor must be able to assign these inputs and outputs. The system described satisfies this requirement through analog switching as illustrated in FIG. 12. Associated with each analog channel is an analog hold capability so that multiplexing can be accomplished among the different direct controllers. The direct controllers also communicate among themselves to exchange the digital data and with the supervisor for data exchange and control operations.

This mechanism is implemented primarily to support flexible and general magnetic bearing control, but it also supports the implementation of fault tolerance. Any inputs and any outputs can be assigned dynamically to any (or many) direct controllers (DCM). Therefore, it is possible to provide system reconfiguration in the event of a direct controller failure. The System supervisor controls the analog signal assignments, so the Supervisor must manage the reconfiguration.

The hardware is designed so that it can support a wide range of different control approaches and fault tolerant mechanisms. The approach to fault tolerance can be modified in the same manner as the control algorithm is changed: through software modification. The most reliable approach to fault tolerance when simple control algorithms are used is the "pair and spare" approach, which has been reported by different authors in the literature. The implementation according to the present invention is illustrated in the flowcharts for the Supervisor and individual direct controllers. (FIGS. 17, 18, and 19.) As part of their regular operation, the direct controllers which are configured to perform self-diagnostics inform the supervisor of their progress. If a direct controller fails its self-diagnostic tests, it is removed from the list of available controllers. The supervisor decreases the count of comparison disagreements for each controller pair as time passes without receiving a comparison disagreement message. Receipt of multiple compare disagreement messages from a particular controller pair in a limited time period causes the supervisor to reconfigure the system to remove both offending controllers (if possible). These controllers are assigned to perform self-diagnostics, and either or both may be returned to service if they pass the self-diagnostic tests.

The use of digital controls is provided both for control flexibility and to produce a fault tolerant system. The significant advances in electronic components now allows for the design of a system that can monitor itself while handling the basic function of acting as a magnetic bearing controller. As depicted in FIG. 3, a hierarchical controller is divided into functions. At the lower level are found redundant digital controllers A, B, C, D, and E (referred to herein as DCM), the conventional sensors and control lines and power lines that are connected to the electromagnets, and also to the bearing position sensors (see FIG. 1). At this level also is the Analog Input/Output Bus that permits any one particular sensor line or any one control line to be switched to and be under the control of any particular controller. This is accomplished through the use of System Coordinator sometimes referred to herein as the Supervisor which acts as a high level controller acting through the System Data and Control Bus of FIG. 3.

The hierarchical circuit design provides switching from one Controller or DCM to another when one shows signs of deterioration. This means that the System Coordinator may call upon any one Controller, such as Controller D in FIG. 3, to control more than one electromagnet in the bearing. In this manner, the System Coordinator can make known to an operator that some type of circuit failure has occurred and which particular Controller has the failure while at the same time the bearing system continues to function with active control maintained. The operator could then remove the particular board having the component failure and replace it with a good board. At that instant, the System Coordinator will be sensing the presence of the new board and when declared acceptable, will switch the new board into functioning (as contrasted with testing) use thereby relieving the multiplexing function that had previously been attached to one of the other Controllers, such as D.

The hierarchical circuit design of FIG. 3 can also implement the rotating field test, for the use of balancing. This means that balancing may be accomplished as the rotor is turning. Or more specifically, the amount of unbalance of the rotor can be ascertained as the rotor is turning. With the System Coordinator functioning, a change of unbalance can be used to again alert an operator that a machine is degrading for some reason and the amount of degradation can be quantified through this means.

The system of this invention also provides for determining experimentally the mode shapes of a rotor. While in support, but not turning, the rotor may be excited through the magnetic bearings. Then with a single probe, scanning along axially, or a series of fixed probes distributed axially, the radial displacements due to the exciting forces induced by the bearing or bearings can be sensed and from the readings the mode shapes can be ascertained. The mode shapes are important for predicting the overall dynamic response of the rotor to any particular type of excitation to which the rotor may be subjected during turning.

The results from the above described tests can be used to deduce the amplification factor of a rotor system. This means that the overall damping of the system can be determined including the combined structural damping of the rotor plus the dynamic damping supplied by the magnetic bearings. The latter quantity is adjustable through the controls of the magnetic bearings and by being able to determine the combined damping of the system, and optimum amount of damping may be set through the bearing control algorithms.

A noise voltage signal comprised of all frequencies of interest, or so called white noise is applied to one or more radial coils in the same plane to obtain a frequency response characteristic of the rotor from the sensor signal or signals. This frequency response characteristic could be obtained from an instrument or an appropriate computer and software which can perform a frequency spectrum analysis. The resulting amplitude versus frequency characteristic or plot yields information such as the critical speeds of the rotor and an approximate sensitivity or amplification factor of the various critical speeds or modes, and they may all be observed on the same plot.

Also important to this method is the fact that any structural resonance due to the behavior of the foundation interacting with the housing, stator, rotor system may also be observed and identified without the rotor having to be turned.

DETAILED DESCRIPTION OF PREFERRED EMBODIMENT

The interaction of the many components that compose a rotating machine must be comprehended in order to understand the various aspects of this invention. A general description of the components is given in FIG. 1 in which a flexible shaft 1 forms the backbone of the rotor. As noted previously, this flexible shaft may not be singled out in a particular system as a single element, but its equivalent will be identifiable mathematically even though it may be executed in hardware as a series of shells or tapered wheels or a combination of short spacers, wheels, cones, and stubs or shafts coupled together via threaded pieces and or bolts. Whatever forms this element, its importance cannot be overstated in the dynamic behavior of the rotating system.

Control of a magnetic bearing requires knowing the relative position of the rotor and the face of the magnet. This is determined by some type of bearing sensor such as 7, 8, or 9, for example; as noted in FIG. 1. In general, each magnetic bearing, whether radial or axial, will require a bearing sensor. Through the relative position, as detected by the bearing sensor, control of the rotor relative to the stator is maintained by an electronic control circuit which varies the current in the magnet and in turn the flux generated by the magnet and hence the attractive force between the magnet and the adjacent rotor element.

Figure 1:
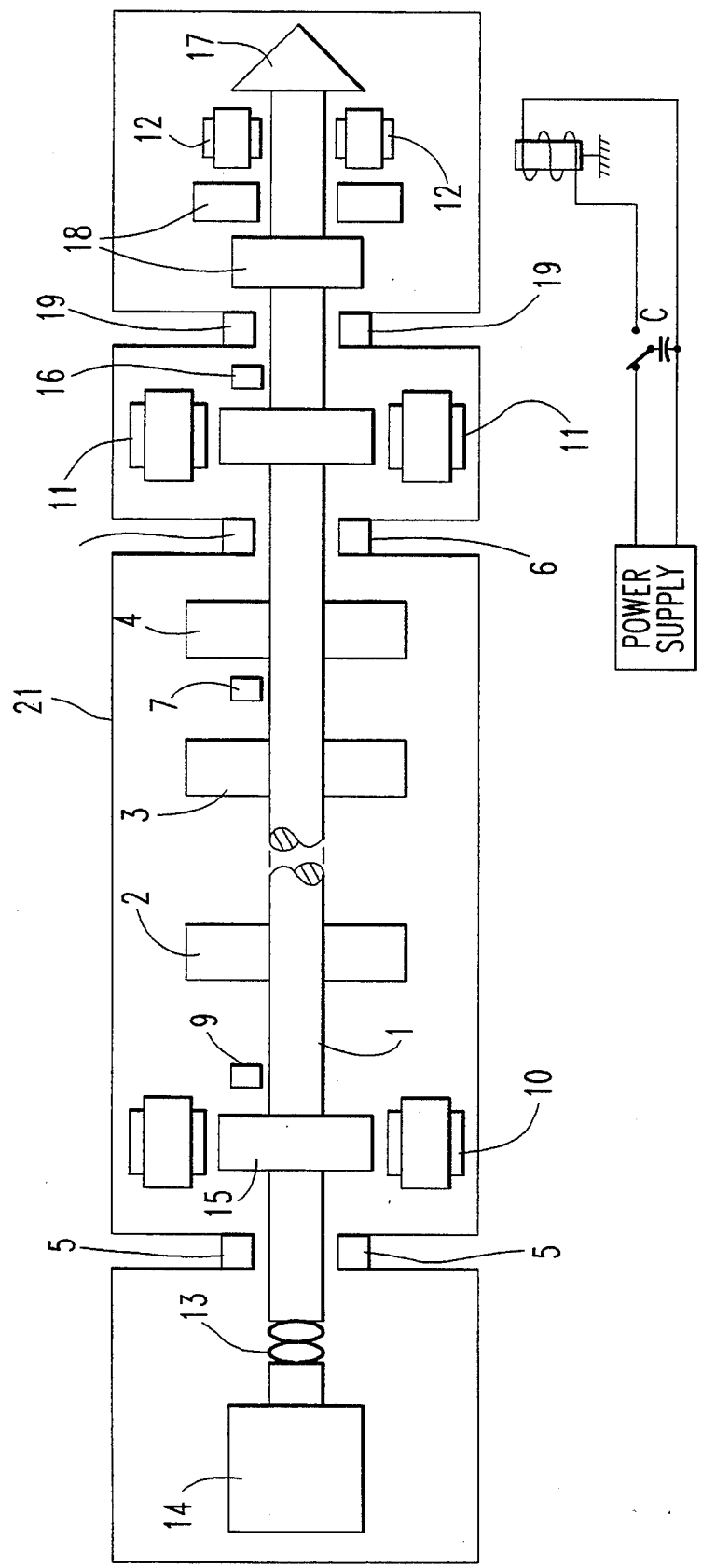
FIG. 1 is an illustration of a rotating machine incorporating the principles of the present invention.

Some form of prime mover 14 will drive the system, that is, cause the rotor to turn about the axis generally described by the flexible shaft 1 of FIG. 1. The prime mover may have a coupling 13 or be solidly affixed to the flexible shaft 1, which in this latter case will contribute in the dispersion of equivalent rotating masses 2, 3, 4 which in themselves may number thirty or more elements. For example, the bearing disks 15, 16, and 18 thrust, collar 19, impeller 17 may be identified as additional shaft masses or may in themselves be further delineated into several mathematical elements for more detailed prediction of the dynamic response of the system. FIG. 1 shows a radial magnetic bearing 10 toward one end of the flexible shaft 1, a second radial magnetic bearing 11 at another location along the shaft, and an axial or thrust carrying magnetic bearing 12 located either near one of the radial bearings or at some other convenient location along the shaft. Each of the magnetic bearings is attached to the stator 21 of the machine frequently known as the housing or otherwise known as the frame of the machine. For each bearing some form of bearing, such as sensors 7, 8, 9 one required to measure the position of the shaft local to each bearing relative to the face of each bearing. Each of the bearings sensors 7 and 8 measure the shaft position in two mutually perpendicular directions each of which is in a radial sense.

Part of the rotor in FIG. 1 is the impeller 17, which in some machines may be identified as compressor or other terminology. In the case of large vibrations, motion of the rotor is limited by radial backup bearings 5, 6 and axial backup bearings 19. These may be some type of anti-friction bearing or special plated surfaces or special elements designed to support the turning rotor for a limited period of time.

All of the turning components described in FIG. 1 taken together define the rotor whose dynamic action is to be controlled through the magnetic bearings. It is this rotor that is contained in housing 21 and may be "canned" by the housing without the requirement of seals, which are normally necessary to separate conventional bearings from the rotor and the housing.

The dynamic characteristics of a machine are defined by the rotor configuration, which includes all of the masses and the flexible shaft, plus the bearings that support the rotor plus the effect of the housing. With magnetic bearings, the stiffnesses and damping qualities may be varied even as the bearing is in operation. As the overall dynamic behavior of the machine stems in large part from the dynamic behavior of the rotor as supported by the bearings, changing the bearing parameters, stiffness and damping factors, implies control of the dynamic behavior of the machine. In particular, certain frequencies of the turning motion of a rotor produce unusual and usually undesirable motions. These frequencies are called "critical speeds" and may be changed by changing the Eigenvalues of the overall system. These Eigenvalues relate to the stiffness and damping parameters of the bearings so that by controlling the magnetic bearing parameters, the overall dynamic behavior of the machine may be controlled.

One portion of this invention is in the means for attaining the control of the magnetic bearing parameters, stiffness and damping factors, as previously defined. One means of implementation of the control of the bearing parameters is by direct analog circuitry in which the amplification or gains of the bearing parameters are switched from one value to another in a prescribed fashion, in which the prescription is based solely on the turning speed of the rotor.

For example, as the turning speed of the rotor increases the speed will approach one of the "critical speeds" of the system. With the prescription method, the bearing parameters would be adjusted in a manner to move the nearest "critical" away from the turning speed, say by increasing the "critical". Then upon further increase in the turning speed of the rotor, the "critical" would be approached again and this time the prescription would shift the magnetic bearing parameters to drop the "critical" below the turning speed. The turning speed sensor would be an analog device providing an analog signal to initiate the switching prescription or algorithm just described.

Another means of implementing the algorithm for the magnetic bearing parameters is through a hybrid circuitry, in which most of the control circuitry is by analog means, but the prescription which would shift the magnetic bearing parameters is implemented by the use of digital potentiometers that are switched according to the turning speed which is indicated by digital means. These digital potentiometers are part of the gain control of the stiffness and damping factors so they directly vary the magnetic bearing parameters.

A yet further means for implementing the gain control for the bearing parameters, stiffness and damping, is via an all digital control system. By this means a computer is employed for the overall control of the magnetic bearing so that implementation of the control algorithm is through a software program that is directing the computer. The use of an all digital control allows the convenient implementation of some additional desirable features of this invention and they will be described in detail. However, the use of the digital microcomputer offers much flexibility in implementing very complex control algorithms for changing the bearing parameters. This means that it is possible to employ an adaptive algorithm through use of the computer. Such an algorithm can take the amplitude of vibration of the rotor at one or more positions, as determined by the bearing sensors and any auxiliary sensors employed for this purpose, and increase or decrease the stiffness and/or damping of each bearing in a progressive manner and then on the basis of the measured vibration level of the rotor, continue changing the parameter in the same direction. Upon determining that the rotor vibration is becoming worse rather than better, the computer control algorithm will reverse the direction of change of the bearing parameters simultaneously monitoring the total vibration level so as to bring the vibration level to a minimum. This adaptive control feature is implementable through the use of the digital computer and permits an optimum setting for the magnetic bearing parameters even in the case of a major change of unbalance of the rotor. The unbalance of a rotor can change through loss of a blade or erosion or buildup of material on an element composing the rotor.

To summarize, the implementation of bearing parameter control may be through an all analog circuit, a hybrid circuit, or an all digital circuit. The control of the magnetic bearing parameters, stiffness and damping factors, provides the means for improving the operating characteristics of a machine by reducing the vibration level of the rotor.

FIG. 2 is a section taken across the axis of a rotor showing one form of magnetic bearing. It depicts four horseshoe shaped electromagnets 22, 23, 24, 25 each having a coil 29, 30, 31, 32 for producing a flux field that passes through the iron of the magnet and through the disk 26 attached to the shaft 27 of the rotor. Each electromagnet is attached to the housing 28. One face of the magnet 22 is noted indicating a clearance 34 between the face and the magnetic disk 26. This clearance is of the order of several thousandths of an inch making it clear that no physical contact occurs between the disk and the face. As pictured in FIG. 2, passing an electrical current through the coil 29 of magnet 22 will produce an attractive force between the disk 26 and magnet 22 tending to lift the shaft upward. Similarly, driving coil 30 of magnet 23 will produce a force acting on the shaft generally toward the right. So with proper controls activating the several independent coils singly or in a prescribed manner, the shaft may be caused to move in any radial direction while simultaneously being constrained by forces proportional to a radial displacement, known as the bearing stiffness, and at the same time being subjected to forces also in the radial direction that are proportional to the instant radial velocity, known as the bearing damping. The totality of these separate forces produced by the combination of the four magnets shown in FIG. 2, or more magnets as can be visualized by anyone familiar with the art, is determined by the control circuitry and in the case of the digital controllers, the computer software employed.

By slowly increasing the frequency of the constant amplitude rotating field and observing the outputs from the various sensors used to control the magnetic bearings, a simulated dynamic response, consisting of amplitude and phase information, of the shaft and machine support mechanism may be obtained.

This simulated dynamic response is essentially identical to that which would be obtained from an actual run up in speed of the machine. Thus, by the use of the increasing fequency rotating field technique, valuable information such as location of critical speeds, structure resonances, amplification factor at these critical speeds and therefore the log decrement and damping ratio of the bearings may be acquired without the necessity of actually running up the speed of a machine in magnetic bearings and without knowing the effects of various control parameter settings of stiffness and damping. Various bearing parameter settings such as stiffness and damping may be evaluated and optimized by this rotating field technique before the machine has ever been run up to operating speed and thus the initial turning period usually associated with a magnetic bearing machine installation may be greatly reduced in time and effort.

Application of said varying frequency constant amplitude rotating field technique indicated the location of critical speeds of the machine as the stiffness and damping parameters are varied and thus permits the setting of said parameters such that the machine critical speeds are properly located in relation to the machine operating speed(s) and that the damping parameters are optimally set.

Also, the application of said varying frequency constant amplitude rotating field technique will yield the lcoation and severity of any mechanical structural or machine support resonant frequency present in the overall system. Amplitude and phase changes will be noted at a structural support resonant frequency and this frequency will remain relatively constant as the magnetic bearing parameters such as stiffness and damping are varied, whereas the critical speeds or shaft resonant frequencies will indicate considerable change as these said parameters are varied.

Another feature of this rotating field technique is to obtain the radial clearances of the gap of the magnetic bearing by applying a low frequency, for example, 5 to 20 Hertz, high amplitude signal for the rotating field, such that the rotor is moved in an orbiting, but nonrotating, fashion until it strikes the auximilary or backup bearing or other structure. This yelds information about the location of a potential rub situation of the shaft and the amplitude of vibration required to encounter such a rub. By further increasing the amplitude of the low frequency rotating field, the exact outline of the maximum clearance possible for all rotational positions for the shaft is obtained. With this technique, it is also easily possible to locate and set the centerline of the shaft to whatever location desired, for example, to obtain the maximum clearance attainable or to make the rotational centerline coincident with the geometric centerline, by the proper adjustment of the bias currents in the supporting electromagnets.

Concerning clearances, yet another feature is the capability to obtain information about the maximum possible clearance for a rotating shaft for the situation of a bent rotor or a shaft with bow, or backup radial bearing which is non-symmetric and thus not truly round. By again applying a large amplitude low frequency rotating field and at the same time slowly rotating, for example, 2 to 4 RPM, the shaft, then by observing the output of the shaft position sensors at each radial bearing individually, the minimum signal observed at a particular rotational angle of the shaft corresponds to the maximum clearance attainable at that rotational position angle of the shaft. This technique may be applied at various time periods throughout the life of a mcahine to measure and compare values to previously measured clearances for judgment of the health of the machine and to determine schedules for possible maintenance work.

Also, said means of the use of the rotating field may be applied for the purpose of measuring and obtaining a trend analysis history of the clearances associated with dry gas seals when such seals are utilized in conjunction with magentic bearings for certain applications, such as typically, use in compressors. As the clearances of these dry gas seals slowly enlarge, by application of this clearance measuring technique, knowledge of the rate of clearance change can be followed in time and thus maximum efficiency concerning the use of the machine and maintenance work schedules may be accomplished.

Another method of determining the maximum dynamic clearance for a rotating shaft by use of the large amplitude constant low frequency rotating field is to feed the output of the shaft position sensors of one of the radial bearings into an X-Y Oscilloscope, such that orbit of the shaft position is traced out on the oscilloscope picture tube. As the rotor is physically slowly turning while the large amplitude low frequency rotating field is simultaneously applied, the minmum amplitude observed on the oscilloscope trace is, when properly calibrated to represent distance in inches or millimeters, the maximum clearance attainable without a rub occurring. This may be more easily observable by capturing the oscilloscope trace, over a period of time corresponding to several complete rotations of the shaft, on film, for example, by use of a Polaroild camera, with the resulting multiple exposure clearly indicating the maximum clearance attainable without a rub occurring, which may only be for certain rotation angles of the shaft, and also indicating the maximum possible clearance regardless of the rotation angle of shaft. This technique is particularly useful, for example, when shaft bow is present and the maximum clearance is dependent on the angle of the rotation of the shaft at any given time.

All of the above diagnostic techniques are applicable to the thrust or axial direction, except that only one change of the two channel rotating field is utilized.

It should be noted, that even though no physical contact occurs between the rotor and the housing, the dynamics of the rotor are prescribed by the rotor configuration, the rotor masses and shafting form, coacting with the electromagnets. And because the electromagnets are under control of the designer, the dynamic behavior of the machine is also under control of the designer. This is one major advantage of this invention—it provides direct control of the machine dynamics and more importantly, control after the machine hardware has been assembled. The same magnetic bearings that support the rotor offer the means for running certain tests on the machine when the rotor is brought into support, whether or not the machine is turning.

For a rotor in magnetic bearings, certain types of testing can be done that are specifically limited to the support means. From FIG. 2, it is apparent that the circumferential arrangement of the magnets offers the means for superimposing a rotating electric field onto the rotor. One can visualize increasing the voltage of coil 29, of FIG. 2, then dropping that voltage while simultaneously increasing the voltage to coil 30 then, repeating the process for coils 31 and 32 and then repeating the cycle. The generation of this rotating field will produce a small rotating radial force to act upon the shaft at whatever frequency that is selected for the rotating field. Depending upon the frequency selected, the response of the rotor will be made up of a weighted sum of the mode shapes excited. Viewed in another way, this means that the rotor modes can be excited singly by tuning the frequency of the rotating field to the specific associated mode. Thus two pieces of information are produced by use of this rotating field, the determination of the critical speeds of the rotor and the mode shapes, which also implies the determination of the location of the nodal points of the rotor. As before, the determination of these data may be accomplished with or without the rotor turning. Applying this varying sinusoidal field to the thrust or axial magnet coil 30 of FIG. 2, would similarly allow the determination of the critical speed, if any, of the actual direction of the rotor.

From the previous description, it is apparent that a rotating field acts on the shaft in the same manner as an unbalance force. For those versed in the art of balancing a rotor, it becomes apparent that the rotating electric field applied to the magnet coils can be related to what is known as a "trial weight" is applied to a rotor as a means of determining the influence coefficients of the rotor. By changing the phase of the rotating electric field relative to a specific position on the shaft, a series of trial weights may be added sequentially to the rotor and the responses measured by the bearing sensors from which data the location and the amount of unbalance in the rotor may be ascertained. What this implies is that one feature of this invention is a balancing machine that is an integral part of the magnetic bearing suspension system for the rotor, and it is a system that can be brought into activation as frequently as is desired. So during the operation of the rotor system as a machine, a pump or compressor or whatever it has been designed for, it may be tested, as though it had been removed from its foundation, for the amount of unbalance, and if it proves to be changing too significantly, then the rotor system can be scheduled for maintenance and rebalanced.

A yet further facet of this invention is the means for determining the cross-coupling that exists with rotors and is very difficult to measure. However, with the rotor in support through activation of the magnetic bearings, a vertical exciting force may be applied to the shaft through use of magnet 22 and magnet 24 by alternately superimposing a small current onto the main support current. By measuring the horizontal motion that occurs at each magnetic bearing, via the bearing sensors, resulting from the vertically applied force the cross-coupling terms may be ascertained for the rotor system. The cross-coupling values are significant when describing the overall stability of the rotor system, i.e., the likelihood of it not running above a certain turning speed without large vibration amplitudes.

In like manner, it is clear that the application of an oscillating force, acting in a radial direction with respect to the axis of the shaft, in any set of magnets with the measurement of the displacement response of the rotor in a direction perpendicular to the oscillating force will be a measure of the cross-coupling of the rotor system. This invention provides the means to determine the cross-coupling through direct application of the controls for applying the oscillating forces of known value and the bearing sensors providing a direct measurement of the displacements, the ratio of these values and displacements being made either by a hand calculator or through an electronic circuit as available with a computer, the ratios so obtained being the cross-coupling terms for the particular rotor system.

This same procedure or technique may also be employed to determine the cross-coupling between the various perpendicular directions at opposite ends of the rotor.

One feature of this invention makes use of permanent magnets in a unique design that provides the bias flux for the electromagnets and within the design does not require that the flux from the electromagnets pass through the permanent magnets. By this means, that less power is required for the electromagnets.

Figure 4:
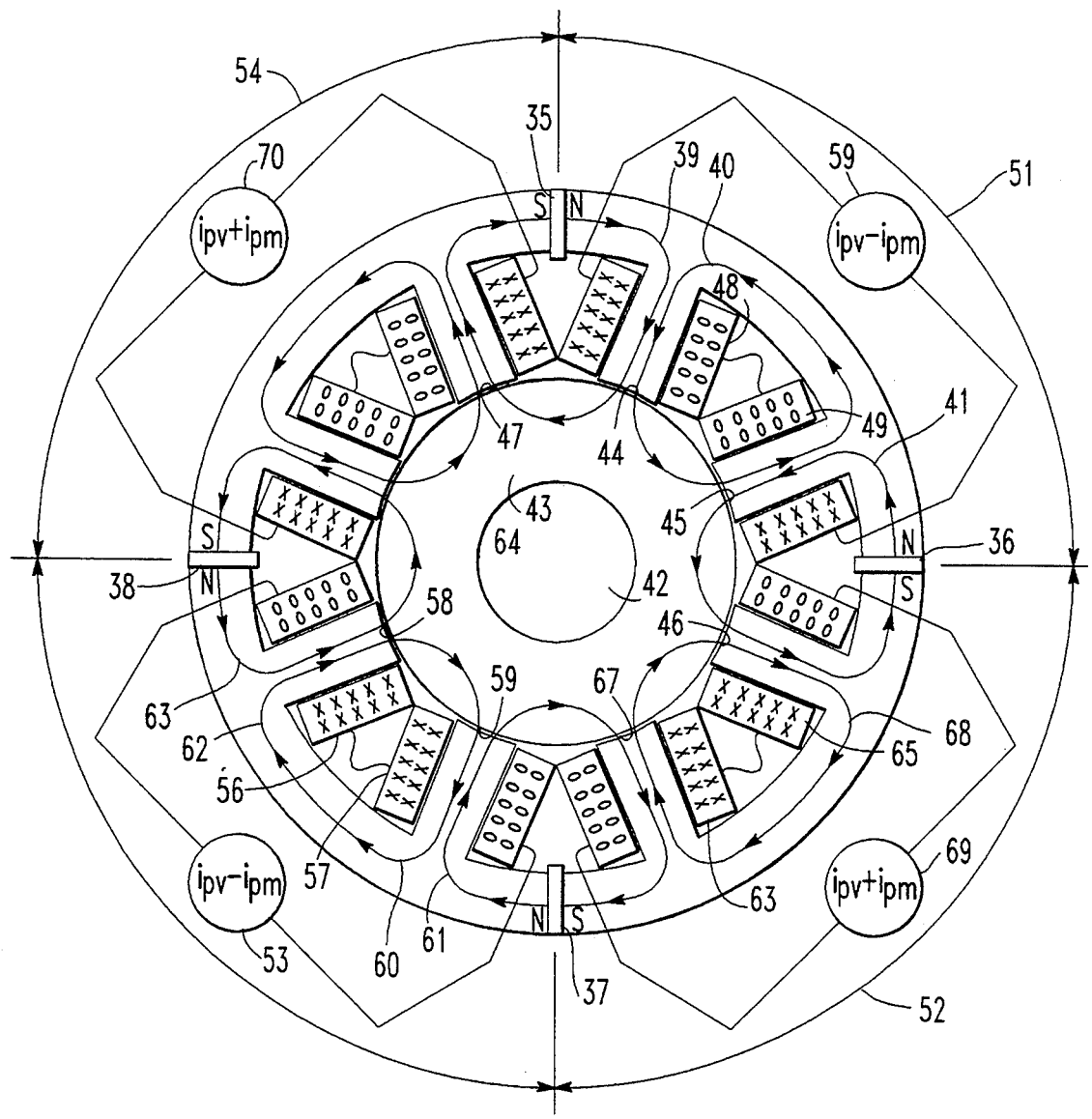
FIG. 4 is a cross-sectional view of a magnetic bearing according to one embodiment of the present invention.

FIG. 4 shows a cross-section of a rotor showing flexible shaft 42, iron disk 43, through which the magnetic fields pass coming from both the permanent magnets as well as the electromagnets. FIG. 4 shows the special relationship of the permanent magnets 35, 36, 37, 38 and the other geometric components. In this figure, the electromagnet coils 48, 49 produce a field described by magnetic path 40 showing the faces 44, 45, through which the fields acts to attract the disk 43. Acting in the same quadrant is the permanent magnet 35 with the magnetic path 39 which acts through faces 44, 47 and attracts the disk 43 generally upward. Note in particular that the magnetic path 40 makes use of iron in such a manner that it does not have to pass through permanent magnet 35. Similar statements may be made regarding the other quadrants of this hybrid magnet bearing.

The electromagnets acting directly in the upper right hand quadrant 51 see electrical currents 50 which produce forces at the faces 44, 45 whose vector sum acts at an angle of 45 degrees from a vertical line defined by the position of magnets 35, 37. Simultaneously, the permanent magnet 35 produces attractive forces acting generally upward through the faces 44, 47 with a vector sum acting vertically upward passing through the shaft center 64 through the magnet 35. At the same time the permanent magnet 36 produces attractive forces on the disk 43 through fluxes passing through the faces 45, 46, said forces summing vectorially in the general horizontal direction acting to the right from the shaft center 64 through the permanent magnet 36. The sum of the vector sums of the three forces just described act in a manner to attract the disk 43 radially outward and generally up and to the right of FIG. 4.

Considering electromagnet coils 65, 66 of FIG. 4, current 69 will produce the flux path 68 which will yield attractive forces through faces 46, 67 generally attracting the disk 43 downward and to the right. It is clear that by controlling the currents 50, 69 and the strength of the permanent magnets 35, 36, 37 the attractive forces sum acting on the disk 43 can be directed in any direction pointing from the shaft center 64 into quadrants 51, 52. Continuing the analysis into quadrant 53 and in consideration of the electromagnet coils 56, 57 and the permanent magnets 37, 38, it should be apparent that attractive forces may be applied to the disk 43 acting in a direction acting generally downward and to the left. And one further consideration of the magnets in quadrant 54 should make it clear that forces can be applied to the disk 43 in any arbitrary direction.

Further consideration of the coaction of all of the electromagnets and permanent magnets of FIG. 4 should reveal the fact that not only may forces act in any arbitrary direction on disk 43 but that they may act in pairs in opposite directions. So it is clear that the paired interaction of the forces in any arbitrary direction signals the fact that the equivalent spring constant of the flexible shaft 42 in any radial direction may be controlled through the electronic controllers (FIG. 3) which set the currents 50, 69, 55, 70. So not only may this bearing support a rotor system, it may be employed to superimpose radial forces which are rotating clockwise or counterclockwise as in the view of FIG. 4. Further, it should be also apparent that through the programming of the forces, superimposed on the rotor supporting forces, that the equivalent of unbalance forces can be added to the rotor system. This is to make clear that the degree of unbalance in the rotor system can be ascertained even as the rotor in turning and at the same time other tests can be run. These tests include the determination of the influence coefficients for the rotor system, the cross-coupling of the system, and even the degradation that might be occurring in the system due to erosion, build-up of material on the rotating elements of the rotor, or partial failure and loss of some components.

One further point of interest relates to the controllers used with the bearing system described in FIG. 4. The flux from permanent magnet 36 is in the same sense through face 46 as the flux produced by the current 69 in the coils 65, 66. Simultaneously, the flux from this same permanent magnet 36 is in the opposite sense through face 45 and produced by the coils 48, 49. The conclusion is clear, namely, that the controllers employed in this bearing are radically different from those that would be required for the same geometrically similar bearing but with the permanent magnets removed. This unique circuitry is a preferable feature of this invention.

Another unique feature of this invention comes from the geometry described by FIG. 4 in which it becomes clear that because the flux paths of the electromagnets do not pass through the permanent magnets, certain advantages occur. The bearing is easy to construct as there are no contorted shapes required for the magnet iron as the flux paths are simple and clear. Secondly, the simple geometry yields a design that is physically shorter than would be required if the iron required for the magnetic flux paths were contorted in the axial direction, that is in a direction perpendicular to the section of FIG. 4.

It should be noted that those skilled in the art would include the fact that the area of face 44 would not necessarily be equal to the area of face 45. The legs with faces 44, 45 carry different resultant fluxes and would not need to be the same for the most efficient use of the material. Further, although the coils are shown as regular cylinders, other shapes taking advantage of the volumes immediately adjacent to the coils as noted in FIG. 4 can yield a more tightly filled magnet coil and therefore be more efficient regarding the space available, hence more efficient from a load carrying viewpoint. This particular geometry is for illustrative purposes to indicate how the flux paths can be optimized to avoid having the flux path of an electromagnet pass through any permanent magnet.

Figure 5:
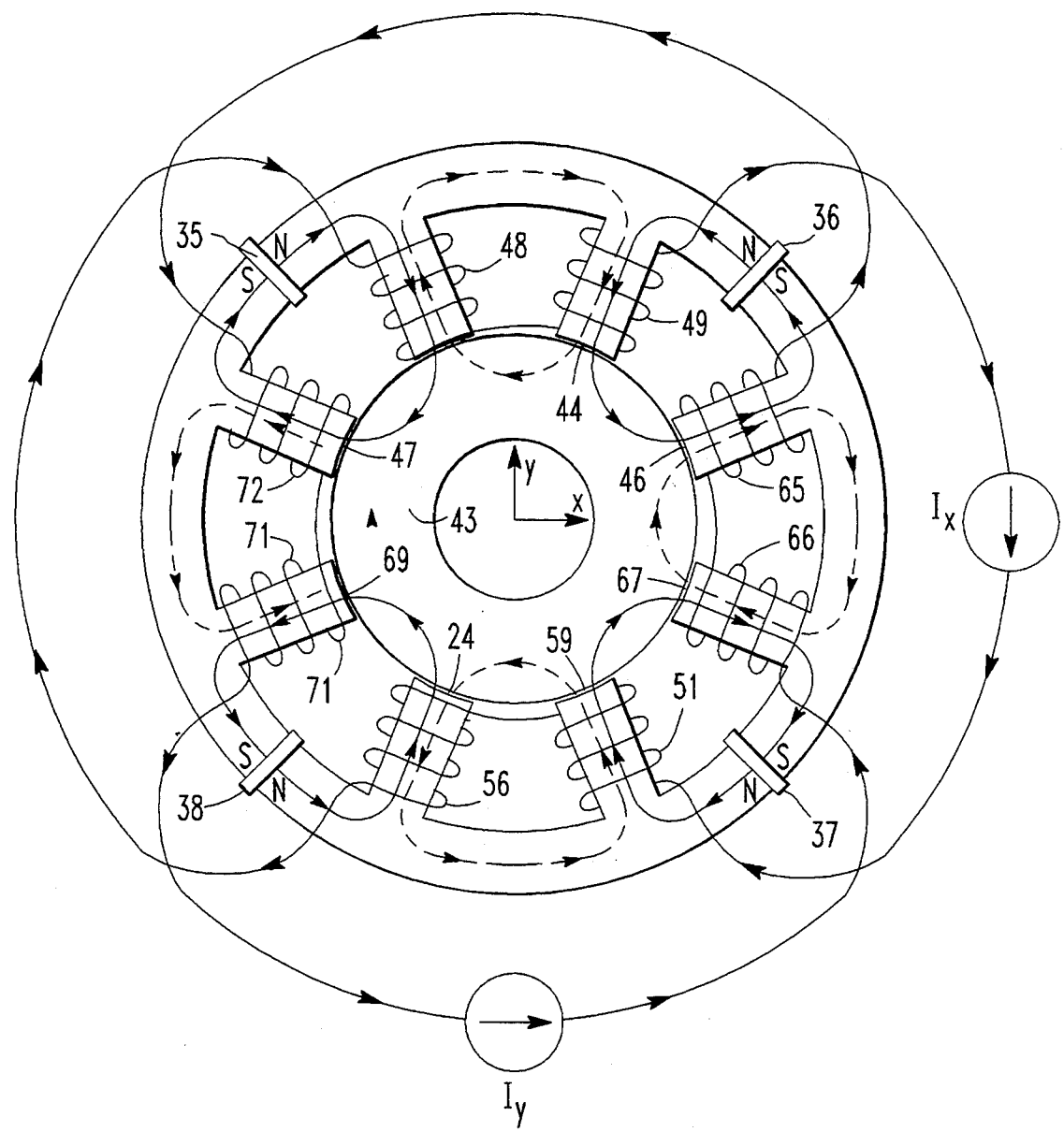
FIG. 5 is a schematic view of the bearing of FIG. 4 rotated to align the X & Y axes with the principle axis of the device.

An alternate description of this magnetic circuit, as illustrated in FIG. 5, will make the operation more apparent. The figure has been rotated forty-five degrees from the orientation of FIG. 4 to align the "x" and "y" axes with the principal axes of the device.

As in previous description, permanent magnets 35, 36, 37, and 38 are employed to establish a biasing magnetic flux of essentially equal magnitude in each of the eight air gaps. The electromagnetic coils are then used to modulate these gap fluxes in such a manner as to produce a net force acting on disk 43.

If the electromagnet coils are wound and wired as indicated in FIG. 5, then the induction of a positive current in coils 65, 66, 71, and 72 in the sense indicated in FIG. 5 by means of a suitably designed electronic amplifier will produce a net upward force acting on disk 43 in proportion to the magnitude of the induced current. This force results from the diminution of the flux in gaps 67 and 69 with the simultaneous intensification of the flux in gaps 46 and 47. If the sense of this current is reversed, then a net downward force will result.

Similarly, if a positive current is induced in coils 48, 49, 56, and 51 in the sense indicated by FIG. 5, a net force acting to the right of the Figure will be exerted on disk 43. This force results from the diminution of the flux in gaps 44 and 58 with the simultaneous intensification of the flux in gaps 45 and 59. If the sense of this current is reversed, then a net force acting to the left will be produced.

From this discussion, it is clear that the forces exerted on disk 43 by a magnetic bearing having the magnetic configuration described by FIG. 5 can be easily controlled by two appropriately designed transconductance amplifiers, one amplifier controlling the horizontal force component while the other controls the vertical component. Further, for a given disk position, the forces produced will be in strict proportion to the induced currents.

Figure 6:
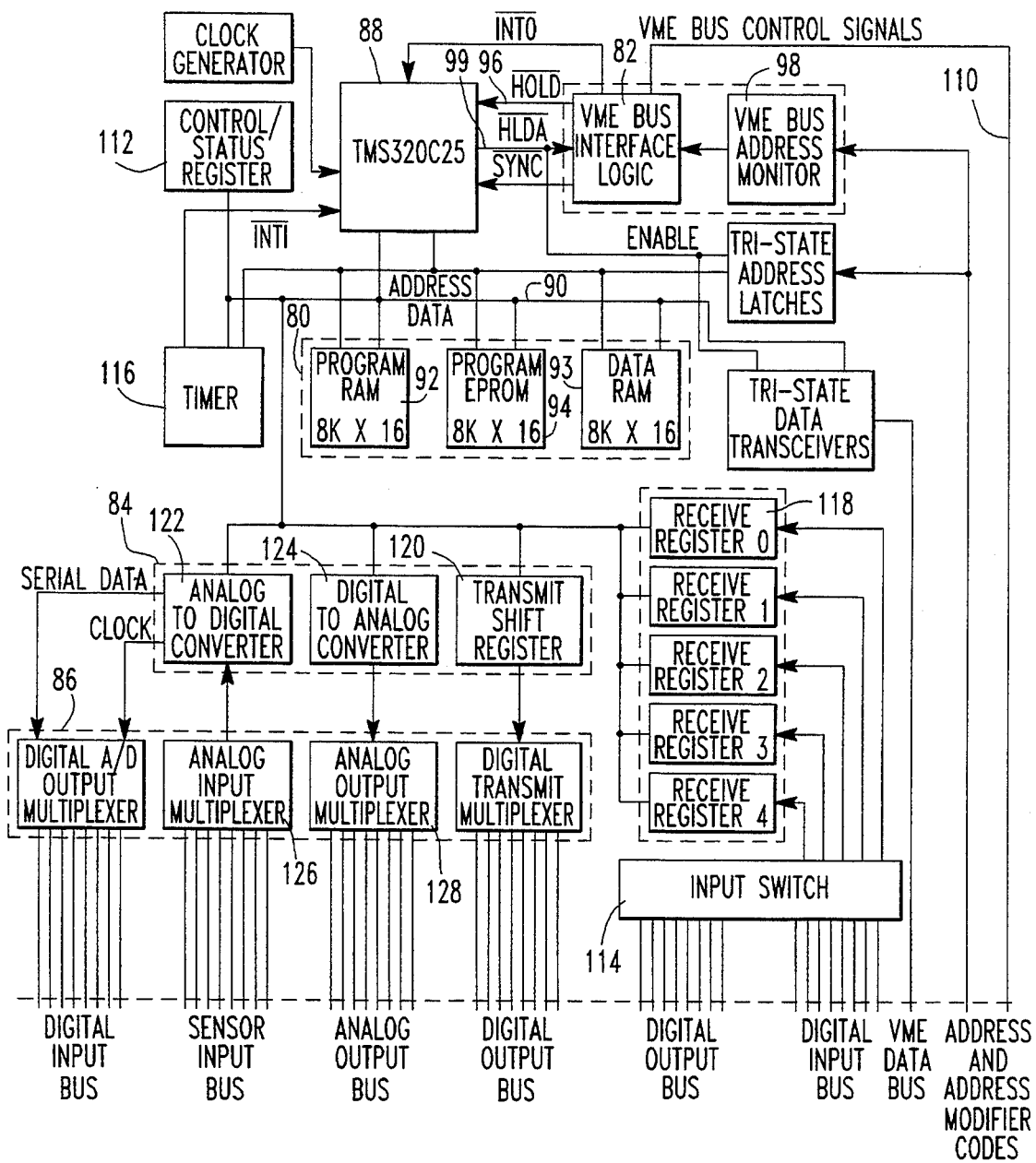
FIG. 6 is a block diagram illustrating the architecture of a digital control processor module in accordance with the present invention.

Referring again to FIG. 3, the lowest level direct digital control of the magnetic bearing is provided by the Digital Control Module (DCM) boards, which are based on the Texas Instruments TMS320C25 Digital Signal Processor (DSP) chip. As shown in FIG. 6, each DCM contains its own high-speed A/D and D/A converters 122 and 124 as well as analog input and output buffers and multiplexers 126 and 128. In addition, each DCM includes hardware to implement the serial intercommunication network. In normal operation, the system will contain five DCM's 202 (see FIG. 3.) with each assigned to control one bearing axis or coordinated control of multiple axes as previously described. Any DCM may control any bearing axis or may be deactivated by the System Coordinator or supervisor. In addition, each DCM may be multiplexed to control more than one axis with a corresponding drop in the sampling rate.

Certain acronyms or abbreviations and their meanings as used in the description are as follows:

| | |
|---|---|
| CPU | central processing unit |
| DCM | digital control module |
| RAM | random access memory |
| EPROM | erasable programmable read only memory |
| CLKOUT1 | clock out |
| STRB | strobe |
| TTL | transistor-transistor logic |
| WR | write |
| RD | read |
| SYSFAIL | system fail |
| DSP | digital signal processor. |

The System Coordinator or Supervisor 200 is a commercially available Motorola 68020-based VME bus CPU with a 68881 floating point coprocessor operating at a 16.67 MHz clock rate. This module is responsible for managing the software implemented fault tolerance capabilities of the system, implementing adaptive control algorithms, and for interfacing with the user and host computer system. Although only one supervisor is included in the current design, others could be added to increase the reliability and throughput at this level of hierarchy.

Since any DCM may be requested to control any axis at any time, it is necessary for each DCM to have the result of every other DCM's recent A/D conversions and control outputs. This loose coupling of processors also allows straightforward implementation of multiple input multiple output (MIMO) algorithms. The entire low-level portion of the system is thus a loosely-coupled multiprocessor structure, with each processor having local program and data memories that are shared by the VME bus, analog I/O, and intercommunication hardware so that they have access to all inputs and outputs with no software overhead.

A novel approach is used in the design of the low-level intercommunication network. This network consists of five independent high-speed serial busses, each with its own clock and data signals. The novel aspect of this digital intercommunication scheme is its implementation. At the start of every sampling period, each DCM initiates an A/D conversion cycle. Conversion is accomplished using Analog Devices HAS-1204BM 12 bit converters, which offer a 2 μS total sample acquisition and conversion time. As the conversion is taking place, the serial data and clock outputs from A/D converter are broadcast over a dedicated serial bus. Each DCM has five 16 bit shift registers to receive the data on each of these intercommunication channels. By using this technique, every DCM receives the A/D conversion result of every other DCM in parallel with the actual conversion process with absolutely no software overhead and very modest hardware requirements. Thus, all of the conversion results are available to every processor as soon as its own conversion is ready. In this application, the use of a serial intercommunication scheme results in no loss of system performance. In fact, there is no faster method of distributing all of the control information among processors, since the serial transfers occur in parallel with the actual conversion process itself.

A practical hardware solution is the use of specialized DSP microprocessors as the central processing element in the DCM design. No other single-chip CPU is capable of performing as well on highly arithmetic-intensive computing such as what is required for magnetic bearing digital control. DSP microprocessors place special demands on the performance of other hardware components of the DCM, so the overall structure and the design of the DCM is discussed herein.

As shown in FIG. 6, the DCM consists of several major components: memory map as shown within block 80, VME bus interface 82, analog conversion and interface section, the serial intercommunications interface, and the CPU. Each DCM includes 8 kilowords of zero wait state 35 nS access time program and data RAM. The digital signal processor chip TMS320C25 referred to at 88 has separate program and data memory spaces as shown in FIG. 7. Physically separating the data and instruction memories and providing each with a dedicated bus allows a significant amount of parallelism to occur in normal program execution.

Internal unit 88 contains independent data and program busses, but the external interface consists of only one 16 bit bus 90 shared by the program and data memory spaces and the I/O devices 84, 86 as shown within blocks 84 and 86. The unit 88 also includes 256 words of on-chip RAM 92 that is dynamically reconfigurable as program or data memory and 288 words of dedicated on-chip data RAM referred to at 93. By using the separate on-chip memories and the two internal memory busses, a significant amount of parallelism is possible if programs and data are all stored on-chip. For example, the MACD instruction performs a signed two's complement multiplication, scales the output of the multiplier, adds the scaler product to the previous sum of products, and shifts one of the multiplicands to the next higher data memory address in a single instruction cycle. As a typical use, access MACD (multiply, accumulate, data move) can compute one output sample for a discrete-time convolution in just one instruction cycle. When executed out of the on-chip program memory, the MACD instruction executes on unit 88 in 100 nS at a 40 MHz clock rate.

A very significant speed penalty is incurred if either the program or the data are stored off-chip. Since there is only one external data bus, the MACD instruction cannot even execute in external RAM. Substituting MACD with a separate multiply, accumulate, the data move instruction sequence requires five instruction cycles plus four times the total number of memory wait states. Thus, with zero wait state external memory, the throughput has been reduced by a factor of five in this case simply because the program is not executing in on-chip memory. However, if a program is too large to fit in the internal memory space, then the throughput with just one external memory wait state will be cut by approximately another factor of two. In the case of MACD, the throughput with just one external memory wait state is cut by a factor of ten. If the MACD instruction were executed out of the fastest commercially-available EPROM's, the throughput would be reduced by a factor of twenty compared to what it was while executing in on-chip memory. Thus, it is clear that best system performance is obtained when all instructions and data are stored on-chip, but if they must be stored off-chip, then the use of zero wait state memories is imperative to maintaining the system performance at a reasonable level. Because of the severe loss of system throughput incurred with any external memory wait states, the external RAM in the DCM has been designed to operate properly with zero wait states with a 40 MHz unit 88.

Also included on each DCM is 8 kilowords of EPROM 94 to allow storage of control algorithms, software for communication with the supervisor, and low-level diagnostic routines. Digital control algorithms should not be executed directly out of the EPROM 94 because of the performance loss incurred with slow external memory. However, the algorithms may be permanently stored there and transferred into the on-chip program RAM for execution at maximum speed. A memory map for the DCM data appears in FIG. 7, which is self-explanatory.

Figure 9:
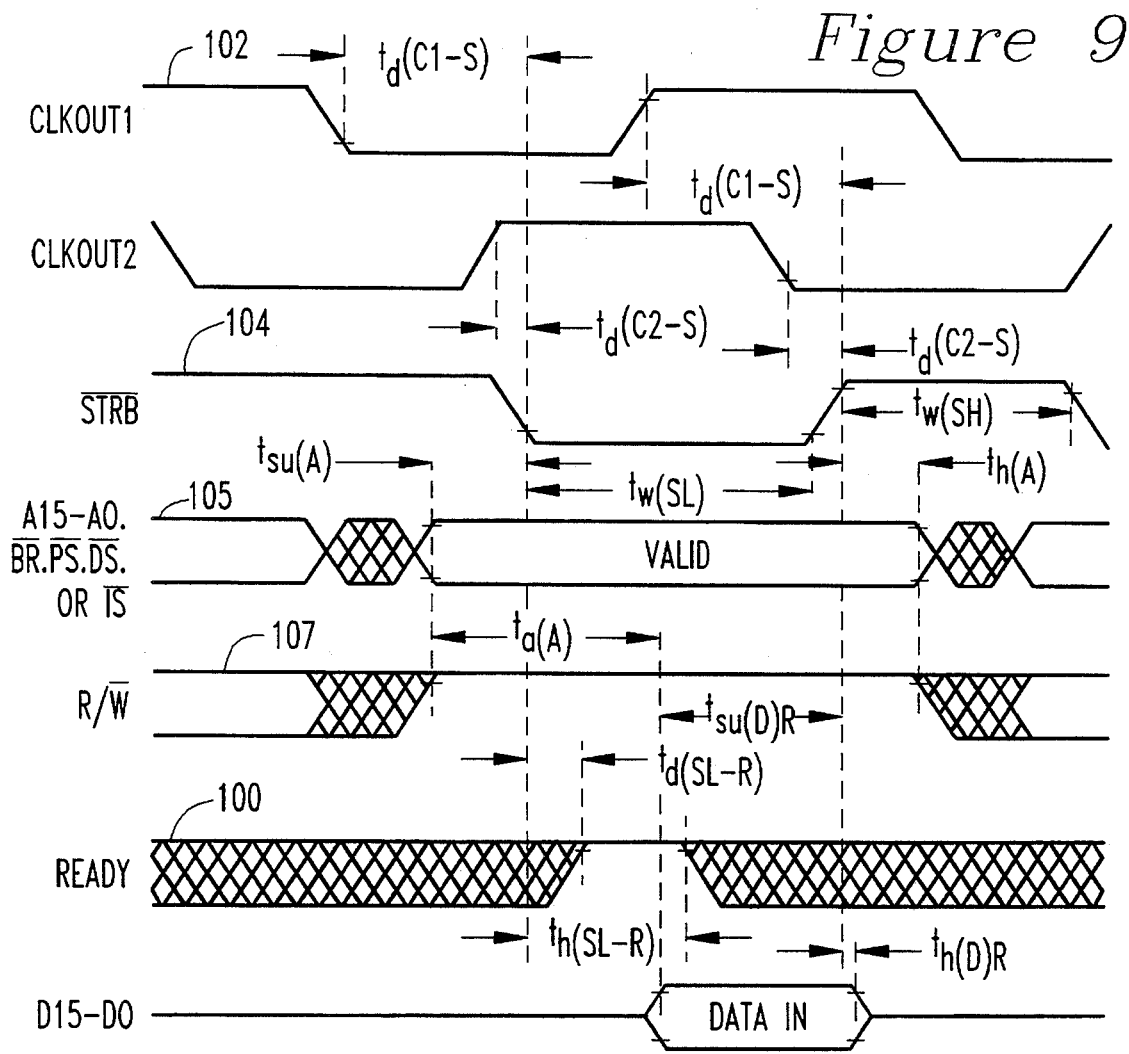
FIG. 9 is a timing diagram for the external memory interface of the system of the present invention.

Referring to FIG. 9, there is shown a memory access cycle timing diagram. To ensure that the external RAM is able to function properly with zero wait states at 40 MHz, it is necessary to consider carefully the timing of the memory cycles of unit 88 (FIG. 6) as well as the structure of the memory decoding network. Unit 88 places very demanding requirements on the memory system if it is to run with no wait states. Referring to FIG. 9 note that the READY signal at 100 is sampled by the TMS320C25 on the rising edge of CLKOUT1 as shown by line 102 after the assertion of $\overline{STRB}$ at line 104. At 40 MHz, the READY signal must be valid no later than 5 nS after $\overline{STRB}$ is asserted for zero wait state operation to be achieved. Since there are I/O devices on the DCM that cannot possibly run with zero wait states, a READY generator which produces variable numbers of wait states based on which device is being accessed must be included. Assuming that a MSI TTL decoder chip will be used to decode the program, data, and I/O address spaces and that the ready generator will consist of two levels of combinational logic, the propagation delays incurred with this memory decoding logic will preclude operation with zero wait states at 40 MHz. Even with the use of the Advanced Schottky (74AS) series of TTL, which is the fastest TTL family currently available, the worst-case propagation delays for these devices sum to 10 nS. Since this is 5 nS more than the maximum allowed time, the obvious approach to memory decoding cannot be used.

The answer to the memory decoding timing problem lies in starting READY generation at 100 and memory decoding before the unit 88 asserts the $\overline{STRB}$ signal at 104. $\overline{STRB}$ is normally used as a reference of the beginning of a memory cycle. However, a significant speed advantage is gained when memory decoding is commenced with the assertion of either $\overline{PS}$, $\overline{DS}$, or $\overline{IS}$ terminals as shown by line 105 of the unit 88 instead of $\overline{STRB}$ on line 104. $\overline{STRB}$ is only used to generate $\overline{WR}$ and $\overline{RD}$ at 107. Doing this allows the time-critical memory decoding and READY generation to commence 10 nS earlier than it would if $\overline{STRB}$ were used as a reference to the start of a memory cycle. The disadvantage of this memory decoding scheme is that the address bus is not guaranteed to have finished settling when the date strobes are activated. Therefore, it is possible for the memory decoder to output transient incorrect information while its inputs are settling. However, generating $\overline{RD}$ and $\overline{WR}$ based on $\overline{STRB}$ prevents any devices from being selected during these transients. Since the memory decoding system has been designed to gracefully handle these possible transients, it is possible to begin memory decoding 10 nS before the falling edge of $\overline{STRB}$. $\overline{RD}$ and $\overline{WR}$ are generated with only two levels of combinational logic, with a 4 nS worst-case propagation delay. By using this technique, READY will be valid 5 nS before the first rising edge of CLKOUT1, and the memory decoding system will work properly with no wait states. Of course, the memory devices themselves must have sufficiently small access times. The devices used in the DCM prototype are 35 nS 64 kilobit CMOS static RAM chips. Since 40 nS after the falling edge of $\overline{STRB}$ is allowed for memory access time, the external RAM is capable of zero wait state operation at 40 MHz.

CPU 88 places stringent demands on the turn-off times of devices connected to its data bus. After a device is no longer requested, it must turn off its output data bus drivers within 15 nS to avoid conflict with the next memory cycle. Although the high-speed static RAM's can meet this requirement, the EPROM, the A/D converter, the 8254 timer, and many of the other I/O devices cannot. Therefore, these devices must be isolated from the fast CPU data bus by a pair of octal bidirectional bus transceivers. These transceivers basically perform the fast turn-off function when they are disabled, so that slow turn-off devices may be used with the CPU 88.

To allow efficient communications between each DCM and the supervisor, a sophisticated VME bus interface circuit 82 has been included. Each DCM board is mapped into a 256 kilobyte portion of the VME bus global address space, and all of the memory and I/O devices on each DCM are available to the VME bus. Arbitration between the local data bus and the VME bus is accomplished using the $\overline{HOLD}$ logic at 96 internal to the CPU 88. Logic to monitor the VME bus address signals at 98 and address modifier codes is included on each DCM. Additionally, the particular 256 kilobyte VME bus address boundary on which the DCM appears is set by a five position DIP switch. If both a valid board address and a valid address modifier code are received, then a $\overline{HOLD}$ request is generated and presented to CPU 88. After the execution of its current instruction, the CPU 88 relinquishes control of its local bus and asserts $\overline{HLDA}$ on line 99 to indicate that it has placed its external signals in a high-impedance state. This acknowledgment enables on-board tri-state buffers that place CPU format control signals generated from the VME bus control signals on line 110 and local DCM control lines. When the on-board READY generator output becomes valid, then $\overline{DTACK}$ is asserted, signalling to the supervisor that the data transfer has been completed. Because CPU 88 format control signals are generated by the VME bus interface logic, the VME bus and the CPU appear as identical bus masters to the memory and I/O devices on each DCM.

This approach has several significant advantages. First, all of the memory decoding and READY signal generation logic used by the CPU may also be used by VME bus interface 82. This is a very important point, because the VME bus requires an acknowledge signal for all data transfers ($\overline{DTACK}$). Sharing this logic eliminates the need for a duplicate VME bus address decoder and $\overline{DTACK}$ generator. Also, use of the existing READY signal generator helps to increase the reliability of the system. If the system supervisor initiates a memory cycle using an unassigned address, even if the address is within the valid 256 kilobyte range of one of the DCM's, then no acknowledgment is sent via the VME bus to the supervisor, and the supervisor's bus timer generates a bus error exception calling the supervisor's attention to the problem.

Fault detection and location routines executed by the supervisor become more effective when direct access is possible to every device on every DCM. This is a result of the increased observability of the overall system by the supervisor. Therefore, the VME bus interface strategy that has been chosen also supports the software-implemented fault tolerance that is used in this system. It should be noted that since each DSP chip will normally be executing out of its internal data and program RAM to increase throughput, the DSP chips do not need to use their external busses except for performing I/O. This allows the CPU to continue execution from its on-chip memory concurrently with VME bus accesses to the DCM. Therefore, this method of intercommunication imposes only a very small overhead on the DCM because of the relatively small amount of I/O being actively performed by the DSP modules.

Figure 10:
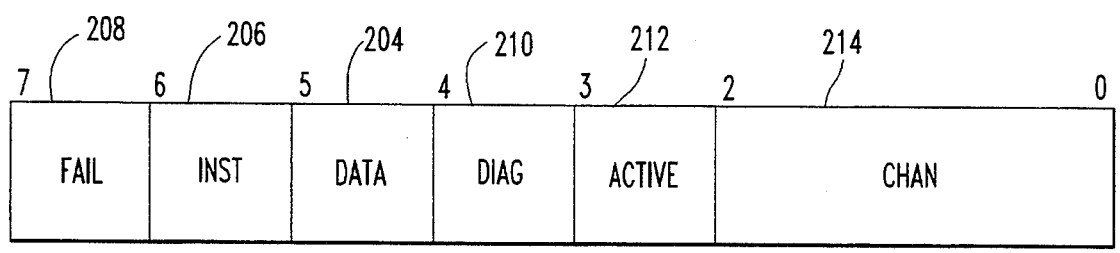
FIG. 10 is a digital module control/status register format.

The system supervisor (see FIG. 3) may pass messages to the lower level DCM's by writing to mailboxes in their memories. In normal operation, each low-level processor executes out of its on-chip data and program memories. When the supervisor wishes to change some of the control parameters or even to load an entirely new control algorithm, it simply writes the data directly to predefined locations in the proper DCM's external RAM. Referring to FIG. 10, each DCM contains an eight bit control/status register 112, which selects the channel that the DCM is controlling, activates and deactivates the DCM, and informs the DCM when it has been given new data and instructions by the supervisor. After the new data has been written, the supervisor sets the DATA and INSTR bits 204 and 206 of the control/status register 112 and interrupts the DCM. By examining the DATA and INSTR bits 204 and 206 of the control/status register, the DCM determines what type of message was passed to it, loads the new parameters or algorithms into its on-chip memory, and continues execution. The CSR 112 also serves several other purposes, as shown by FIG. 10. The most significant bit 208 is set to indicate that the DCM has failed. It is set upon power-up, reset, by a watchdog timer time-out, by the depression of the front panel HALT pushbutton, and its contents may also be modified only by the system supervisor. The DCM cannot reset the FAIL bit 208 once it is set; only the system supervisor is able to do this. The FAIL bit also drives the VME bus $\overline{\text{SYS FAIL}}$ signal low when the board is not in diagnostic mode. A DIAG bit 210 is set to indicate that the DCM has been placed in the self-diagnostic mode by the system supervisor. When set, this bit causes the front panel DIAG indicator to be illuminated, and it also forces the DCM to release the $\overline{\text{SYSFAIL}}$ line. Finally, the three least significant bits 212 and 214 are decoded and used to determine which control channel the DCM is currently servicing.

The DCM includes logic to monitor the VME address modifier code signals, the address bus, and the data transfer width signals. A memory access on the VME bus will cause the $\overline{\text{HOLD}}$ input to the TMS320C25 to be asserted only if a valid address modifier code, a valid board address, and a valid data transfer length are detected. Currently, the DCM responds to address modifier codes for user and supervisor program and data memory cycles match the settings of the five address DIP switches. The DCM design allows it to respond to 8, 16, and 32 bit data transfers. If a memory access is made to an address that corresponds to a device with fewer than the specified number of bits, the extra most significant bits are ignored.

Interrupts are used for several functions within both levels of the system. At the DCM level, the supervisor may interrupt the CPU 88 at its highest maskable level to indicate that it has placed new control information into the control/status register. The DCM's also interrupt the supervisor if a fault is detected by either a watchdog timer or a self diagnostic routine. To facilitate testing and demonstration of the fault tolerant capabilities of the system, each DCM also has a front panel switch 114 which may be used to stimulate a board failure. The DCM cannot assume mastership to the VME bus to transfer information to the system supervisor. Instead, when an on-line DCM needs to communicate with the system supervisor, it interrupts the supervisor with $\overline{\text{SYSFAIL}}$. The supervisor determines which DCM is requesting service.

Each DCM also has a three channel 16 bit programmable timer 116. One channel is used for the watchdog timer function, one is used to interrupt the CPU 88 at the beginning of each sampling period, and the third is uncommitted. Due to a lack of available I/O ports, the timer has been mapped into the data memory space of the CPU 88 (see FIG. 7). The timer internal to the CPU 88 is unused in the current design.

Finally, it should be noted that commercially available VME bus interface chips are currently available. These VME bus interface chips were not used for several reasons. The DCM was purposely designed with a reduced VME bus interface to enhance the reliability and fault isolation properties that the system attains. For example, it is impossible for a DCM to assume mastership of the VME bus. When a DCM needs to send status information to the system supervisor, the supervisor is informed of this with the $\overline{\text{SYSFAIL}}$ signal. All data transfers are initiated and controlled by the supervisor. If the DCM's could assume bus mastership, then it is possible that a faulty DCM would cause a situation where no other processor could take over the bus. In this case, the intercommunication among processors would completely fail, and a complete system failure could result. In the current implementation, if the circuity driving the $\overline{\text{SYSFAIL}}$ signal fails, then only two failure modes are possible. Since the $\overline{\text{SYSFAIL}}$ drivers are open-collector TTL buffers, this line may either become stuck-at-0 or floating as a result of a DCM failure. If the $\overline{\text{SYSFAIL}}$ output of a DCM becomes stuck-at-0, then the supervisor will get a constant indication that the system has failed. In this case, the supervisor will continually attempt to identify the failed DCM, but the local DCM fault will not cause other processors to malfunction. If the $\overline{\text{SYSFAIL}}$ output fails and becomes floating, then this fault obviously is not propagated, but the failed DCM cannot report its failed status to the supervisor. By requiring that all DCM's pulse their $\overline{\text{SYSFAIL}}$ lines periodically, the second failure mode can be detected, however.

As previously discussed, the DCM includes hardware to allow serial intercommunication of control inputs and outputs to all other DCM's in the system with no software overhead as indicated by 84, 86 in FIG. 6.

The serial input interface broadcasts the current analog-to-digital converter data to all DCM's in parallel with the actual conversion process itself. When an A/D conversion is started with the assertion of the $\overline{\text{ENCODE}}$ signal, the HAS-1204BM A/D converter begins its conversion sequence. This device is a completely self-contained data conversion system, including a high-speed track-and-hold amplifier, a 1.54 μS 12 bit successive approximation A/D converter, and a timing generator. The complete sampling and conversion sequence requires a total of 2 μS to complete. During the conversion, the A/D converter's serial data and clock inputs and the conversion complete signal are demultiplexed onto one of the SERIAL INPUT busses. These busses have been implemented with the user defined pins on the VME bus P2 connector. The output demultiplexers are implemented with five tri-state octal buffers, with one buffer per control channel. The three least significant bits of control/status register 112 are decoded and used to activate one of the buffers. In this way, the CHAN field of CSR 112 directly controls which channel the DCM is controlling. Each DCM has ten 16 bit shift registers 118 to receive serial data broadcasts—five for the serial input bus and five for the serial output data bus. These shift registers are mapped into the CPU 88 I/O space. The shaft registers that have been chosen for this design include tri-state output latches for storing the contents of the shift register when the transmission has been completed. Latching of the shift register contents is initiated by the trailing edge of the A/D converter conversion complete signal, which is demultiplexed onto dedicated serial bus lines. Since the serial data for each channel are latched and presented to the CPU 88 only when the conversion is complete, the loose synchronization that is so important to this architecture is easily obtained.

Figure 8:
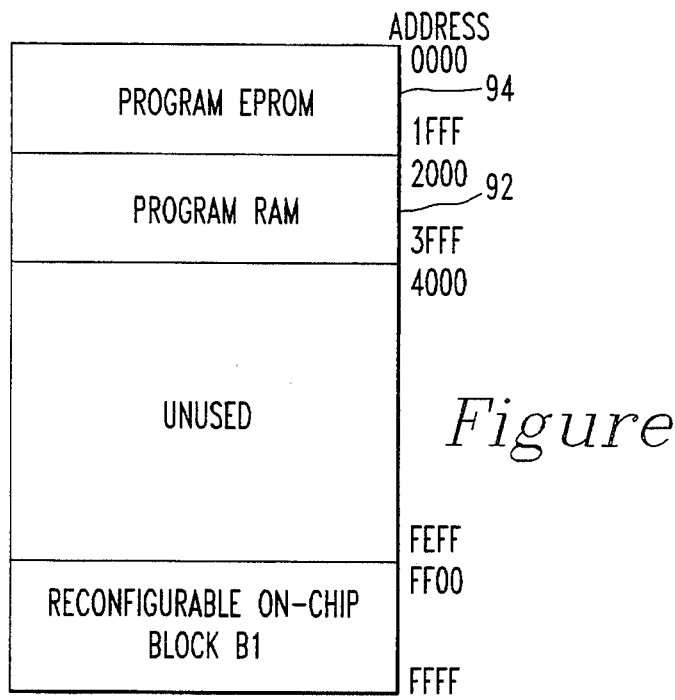
FIG. 8 is a data controller module program memory map.

The serial output data interface has been designed and implemented in a fashion similar to the serial input data interface. When the DCM wishes to broadcast output information to the other DCM's, the data is written to the serial output interface. This interface is mapped into the I/O address space of the CPU 88. A map of the I/O address space appears in FIG. 11. When written to, this interface automatically transmits the 16 bit data given to it over the serial output bus pointed to by the CHAN field of the CSR. The output transfer is clocked by CLKOUT1 (see FIG. 8) from the CPU 88. A transmission complete signal serves to latch the received serial data on each DCM. At a 20 MHz CPU clock rate, an output broadcast time of 3.2 μS is achieved, and at 40 MHz, the time decreases to 1.6 μS. All of the serial interface circuitry has been designed to operate at a 40 MHz CPU clock rate. CLKOUT1 was used to clock the serial output to support the loose synchronization desired in this architecture. Since the DCM's may be as much as 100 nS out of synchronization while operating at 40 MHz, all of the serial transfers will be completed within a 100 nS time window. Therefore, the DCM must wait at least 100 nS beyond the earliest time at which the transfers could have been completed. In practice, this waiting is built into the DCM software. By scaling the transmit clock speed to the CPU speed, the length of the time window will also be scaled by the same factor. The result is that software written for a 40 MHz DCM may operate properly on any other speed DCM. Therefore, the synchronization task that must be handled by the software is not a function of CPU clock speed.

In the original design, the serial output busses also had five dedicated 16 bit shift registers on the DCM to allow the output data to be received. However, due to severe space limitations on the prototype VME bus wirewrap board, only five 16 bit shift registers are shared by the input and output busses on the prototype. This has several implications. Most significantly, the shift registers must be switched between the serial input data and serial output data busses at the appropriate times by the DCM. This requirement places some constraints upon the timing of the input and output broadcasts and places additional constraints on processor synchronization. First, the input data and output data broadcasts, if they are both needed, must take place as serial operations instead of in parallel as in the original design. Second, the shift registers may be switched between the input data bus and the output data bus only when all of the transfers are complete on all five busses. In the real system, this is not much of a problem, but the programmer needs to be aware of this somewhat unusual constraint. Since the use of shared shift registers increases the number of synchronization constraints placed upon the system and since it requires the input and output data broadcasts to occur as serial events, it is suggested that future DCM's include ten independent shift registers.

Because the characteristics of the analog system components have such a large effect on the overall control system performance, a significant amount of effort has been placed into their design and implementation. In general, it is very difficult to achieve high resolution and accuracy in the analog portions of a highly complex digital system. Many problems are encountered when designing hybrid analog and digital systems. Among the most difficult to manage are noise pickup and proper grounding of the analog and digital circuitry.

Each DCM has its own high-speed 12 bit A/D and D/A converters 122 and 124 and analog input and output multiplexers 126 and 128. The multiplexers allow the DCM to be multiplexed among the analog input and output busses. Every analog input from one of the busses is buffered by a high common-mode rejection ratio differential amplifier to help reject noise picked up in the busses. Noise that is induced onto the analog busses will have approximately the same waveform on both of the differential lines, making it a common-mode signal component. The purpose of the differential amplifiers is to reject such common mode signals, which may only be noise. The common-mode rejection of the differential amplifiers degrades with increasing frequency, but at low frequencies (under 100 Hz), about 80 dB of rejection is attained. To increase the signal-to-noise ratio further, the analog inputs 126 to the DCM's are driven differentially by the analog I/O module (FIG. 14). This raises the signal level by an additional 3 dB, resulting in a 3 dB increase in signal-to-noise ratio.

Proper circuit layout and grounding practices are critical for satisfactory operation of the analog components on board the DCM. A separate low noise linear power supply powers the analog circuitry in the system. Also separate power supply returns prevent analog and digital ground currents from being summed into a common conductor. Since the digital return currents consist of high-amplitude transients when a switching operation is performed, the digital ground is very "noisy" due to the non-zero impedance of the ground conductors. Separate power supply returns prevent this noise from coupling into the analog circuitry. The analog and digital power supply grounds are connected to each other only at their ground terminals. The analog and digital circuits have also been physically separated from each other to reduce induced noise. Furthermore, when unshielded analog and digital signal paths had to cross, they were routed perpendicularly to reduce induced noise.

The settling time of the analog components is a major concern when the DCM is multiplexed. For example, when the CHAN field (FIG. 13) of the CSR 112 is incremented to effectively force the DCM to control a new channel, the analog input multiplexer and differential amplifier must both settle before the A/D conversion sequence may be started. Likewise, the CSR CHAN (FIG. 13) field must not be changed immediately after an output is sent to the D/A converter so that the analog output bus 150, the differential amplifier 152 (FIG. 12), and the sample-and-hold amplifier 154 on the analog I/O module have sufficient time to settle. These considerations require the use of high-speed analog circuit components. The analog multiplexers 153 selected were the fastest eight channel differential multiplexers that could be found. Similarly, the instrumentation amplifiers, while certainly not the fastest available, represent a good trade-off between cost, common mode rejection ratio, and settling time. For the current design, at least 1.5 $\mu$S must be allowed for the analog input circuitry to settle to within 0.01% of the final value ($\frac{1}{2}$ LSB at 12 bits resolution) after the CHAN field is updated. The same settling time is required after the D/A is given a new output value. These times have actually been measured by measuring full-scale step responses. If these minimum times are violated, then several undesired effects are noticed. First, there is considerable crosstalk between the analog channels. Second, the analog outputs become quite noisy, and finally, signal amplitudes are reduced. These timing requirements are very easily met with the proper software design, hereinafter outlined. However, they limit the ultimate system throughput to a sampling rate of 333 KHz. Faster converters, analog multiplexers, and amplifiers will be required to achieve higher sampling rates.

Even with a slower TMS32020 CPU (20 MHz), a multiplexed five channel proportional-derivative (PD) control algorithm has been implemented at sampling rates of 100 KHz, or 20 KHz per axis for five axis control, which meets the original design requirement. Using the faster chip referred to as CPU 88 will at least double the sampling rate to a total of 200 KHz when operating in multiplexed mode. Note that substantially higher sampling rates can be achieved when the DCM is not multiplexed, because no overhead is incurred in switching among the channels. Operated in single-channel mode, the DCM can currently operate at a 200 KHz sampling rate. This will increase to the 333 KHz maximum allowed by the analog circuitry when a faster CPU 88 is substituted for the slower CPU. Because of the sampling rate limitation imposed by the analog circuitry, the use of a CPU 88 will not greatly increase the maximum sampling rate with the PD control algorithm since most of the increased computational capacity would be wasted waiting on the analog circuits. However, more complex control algorithms where system throughput is limited by CPU speed will be benefitted by the use of the faster CPU 88.

The design of a high-performance analog module to be used in an environment as harsh as a VME bus multiprocessor system is quite difficult. By far, the biggest problems encountered are noise pickup due to electromagnetic coupling between analog and digital signal lines, noise introduced into the analog circuitry through the power supplies, and noise resulting from the non-zero impedance of ground return paths.

Referring to FIG. 12, analog I/O modules 126, 128 serve several functions in this system. First, they store the analog outputs on each analog bus as they become available. Second, they provide filtering of the reconstructed analog control outputs. Also, the analog I/O modules incorporate differential analog line drivers to drive the analog input busses connected to the DCM inputs. Finally, this module gives the system the ability to test its analog busses and the analog components.

The analog I/O module uses a simplified VME bus interface circuit 82. Each analog I/O module simply has an address monitor, a $\overline{\text{DTACK}}$ generator, and a control/status register such as 112. The analog I/O module is mapped into a 16 byte portion of the VME bus short I/O address space. When a valid board address is received, the analog I/O module asserts $\overline{\text{DTACK}}$ to the VME bus master and gives access of its control/status register 112 to the master. Address pipelining is not handled in this VME bus interface for several reasons. First, since there is only one device on the analog I/O module that may be accessed by the VME bus, there is no possibility of pipelined memory cycles being issued by the master. Furthermore, the Motorola MVME-133A supervisor module does not incorporate address pipelining. Since the handling of address pipelining is a major reason for the complexity of the DCM's VME bus interface, it was not used here.

Control/status register 112 serves two purposes, as shown in FIG. 10. The three least significant bits of the analog I/O module CSR provide an address to the analog loopback multiplexer specifying which analog channel is to be placed in test mode. The next most significant bit serves to enable or disable the module. When disabled, the module must disconnect its output drivers from both the analog input bus driving the DCM's and also from the system outputs driving the external power amplifier. Since redundant analog I/O modules may be incorporated in the system, it is necessary for a disabled module to disconnect itself from these analog signal lines to prevent analog bus contention. The enable bit also causes a front panel status LED to be illuminated.

The analog circuitry is rather straightforward in its design and implementation. Inputs 157 from the shaft proximity sensors are buffered by an overload-protected differential line driver stage 159. After passing through the output switches or multiplexer 128, the differential signals are sent to the DCM's via the dedicated analog input busses such as 161.

The circuitry that receives the analog output data from the DCM's via the analog output busses consists of a differential line receiver, a sample-and-hold amplifier such as 132, a variable pole lowpass filter such as 134, and an overload protected output buffer 136 to drive the external power amplifier. Sample-and-hold amplifiers 132 store the correct analog output voltages as they appear on the output busses. The sampling sequence is triggered by the output ready bus from the DCM's. When a DCM writes to its D/A converter, it automatically pulses the output ready bus line at 138 corresponding to the channel it is controlling. This triggers two cascaded monostable multivibrators 140 which generate the proper sample/hold timing required by the sample-and-hold amplifiers. Output lowpass filter 134 is a simple first-order filter with the cutoff frequency set by a variable resistor in accordance with the sampling rate that the system achieves. This controller should sample sufficiently fast to control vibrations at 7 times running speed. In the current design, this pole may be placed anywhere between 1 KHz and 100 KHz. These variable resistors must be manually set in the present design, so it may be desirable to have the lowpass filter cutoff frequency under control of the supervisor in the future. The output filter is necessary to smooth the stairstep outputs of the sample-and-hold amplifier so that the power amplifier's maximum current slew rate will not be exceeded.

Each analog channel 138 includes dedicated timing generator. This circuit monitors the output ready bus from the DCM's to determine when an analog output has been placed on an analog output bus line by a DCM. When an output ready line is activated, the monostable multivibrators in the timing generator 140 begin their timing sequence. First, a 2.4 $\mu$S delay is generated to allow the DCM's analog output multiplexer, the analog output bus, and the differential input stage to settle. This delay is necessary because the output ready signal is sent just as the DCM's D/A converter is given the new output value. This initial delay allows the analog input to the analog I/O module to settle to within 0.01% ($\frac{1}{2}$ LSB at 12 resolution) before the analog output bus is sampled. Next, a 1.54 $\mu$S duration sample pulse is sent to the sample-and-hold amplifier. While in the sample mode, the sample-and-hold amplifier 154 (FIG. 14) charges an internal capacitor with a buffered replica of its analog input signal. When the multivibrator timing period expires, the sample-and-hold amplifier enters the hold mode. While in the hold mode, the internal storage capacitor is disconnected from the input buffer and connected to the output, so that the sampled analog voltage is present at the sample-and-hold amplifier's output terminal. Changes at the input of the sample-and-hold are not passed to the output while the device is in the hold mode.

Because the DCM inputs and outputs are in analog form and because each physical control channel has its own dedicated analog bus, the analog I/O module needs no knowledge about which DCM is producing the outputs for which channel. The analog I/O module simply samples the correct analog output bus when a DCM instructs it to do so via the output ready bus.

Referring to FIG. 14, the analog I/O module includes a redundant analog channel to support analog component testing. By setting the address bits in the control/status register 112 appropriately, the supervisor can place any analog channel on the analog I/O module in loopback mode, as illustrated in FIG. 14.

Under the direction of the supervisor, DCM's may be placed in loopback mode. When operated in this fashion, the DCM input is switched to the analog test bus 163. This bus is driven by the analog test multiplexer 153 on the analog I/O module. The channel that is routed to the test bus with the multiplexer is selected by the supervisor on line 165 with the three least significant bits of the analog I/O module command/status register 112. Assuming that each DCM is broadcasting its serial output data on bus 167, then it is possible to test the analog signal path as well as the serial intercommunication network simultaneously. This is accomplished by having the DCM in loopback mode convert the voltage appearing on the test bus to digital format and comparing the conversion result on bus 161 to what it received over the digital intercommunication or serial output bus 167. This technique of analog component testing thus relies on comparing the result of the conversion of the analog test data to the original digital information received over the serial bus. The supervisor will be informed of any miscompares that occur over line 170. It should be noted that the loopback testing may be performed concurrently with control computations in an on-line DCM or in an off-line DCM.

A simple bit-by-bit comparison cannot be successfully used in this application, because it is very unlikely that the conversion result and the direct digital transmission will be equal even if the system is operating correctly. Noise induced into the analog signal path and accuracy, gain, and linearity limitations in the D/A and A/D converters will introduce significant error into the conversion result of the test channel. One way of avoiding this problem is to compare only the most significant bits of the two quantities. For example, it may be desired to only compare the eight most significant bits. Even using this technique, there are circumstances under which a small amount of noise will yield an incorrect miscompare. For example, if the correct A/D output should be 011111111111 but an input noise transient causes the output to become 100000000000, then a single bit of error will render the comparison of even the uppermost significant bits inaccurate. The solution to this problem is to use a technique called pump-up, where a single miscompare does not signal a permanent fault. Rather, several miscompares are required for the supervisor to suspect a permanent hardware failure. This technique also allows for graceful recovery of the system from noise transients or transient faults.

The loopback mode of FIG. 14 allows for simple, efficient, and effective testing of the analog circuit components and the busses. This technique may be used by on-line DCM's as well as modules that are in self-diagnostic mode. If it is desired for an on-line DCM to perform concurrent testing of the analog circuitry of either itself or another DCM, then its input may be multiplexed between its control channel and the test bus to perform two A/D conversions during every pass through the digital control loop. The second conversion will be compared to the data received over the appropriate serial bus, and the supervisor will be informed if a miscompare occurs.

In order to reduce the level of noise induced by coupling between the analog signal lines and other signals in the system such as logic signals, 60 Hz power, and interference produced by the switching power supply, all of the analog busses are differential, with maximum signal swings of 20 volts peak-to-peak. Noise picked up will be the same on both of the differential lines, and this noise can be rejected using high common mode rejection ratio differential amplifiers at both the DCM and the analog I/O module input stages. Making the analog signal excursions as large as possible and using differential amplifiers to receive all analog signals will greatly reduce coupled noise. Further, considerable attention was given to implementation of the analog I/O bus in the actual system. These lines such as 138 and 161 have been constructed as twisted pairs, with the shortest length possible. Also, the analog signal lines have been placed as far as possible from digital signal lines, and where crossing was unavoidable, they crossed perpendicularly.

The software in the system has been designed to have a modular structure. With this underlying design philosophy, the software may be written in small, relatively independent modules to facilitate debugging and to reduce the software maintenance task. Additionally, the use of common, highly-tested software modules will reduce the probability of design or coding errors entering the software.

Figure 15:
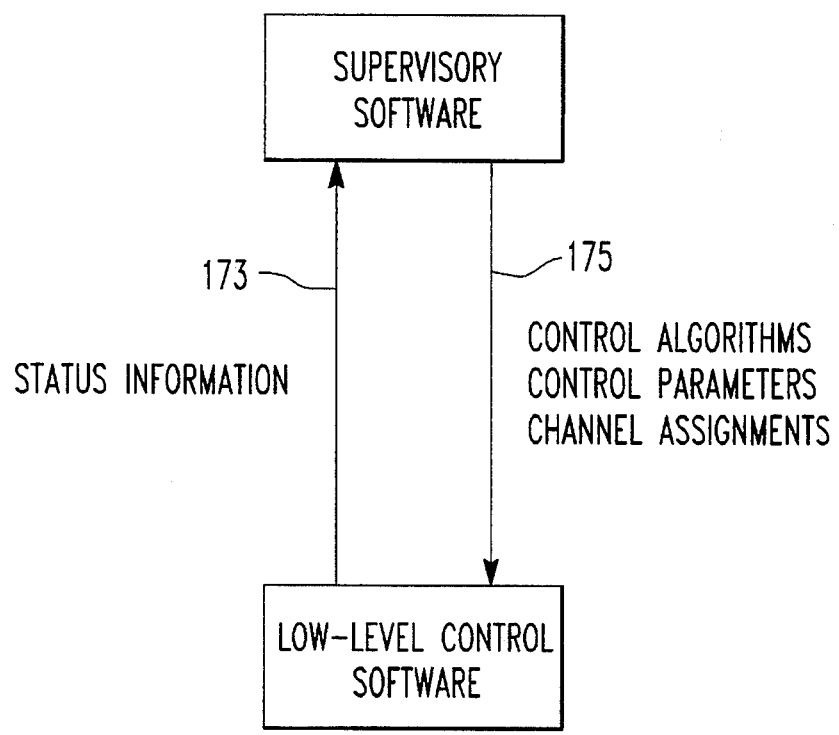
FIG. 15 is a block diagram illustrating the overall general software structure for the system of the present invention.

The system software has been divided into two portions, corresponding to the two levels of the hierarchical architecture. As shown in FIG. 15, the DCM's execute relatively simple control algorithms such as status information of path 173, while the supervisory software performs the higher-level adaptation and fault tolerance management such as control algorithms, control parameters, and channel assignments over path 175. The interface between these two layers of software is implemented with message passing. By doing this, the DSP microprocessors only have to perform the actual digital control. Therefore, the DSP chips need only be programmed to perform the low-level, time-critical control computations, which is what their internal architecture and instruction sets are designed for. An additional significant advantage is provided by this software structure. By allowing the low-level control structure to conceal many of the details of this software implementation from the higher-level supervisor, many of the peculiarities of the architecture and the instruction set of the DSP need not be considered by the supervisor or by the system user. Instead, the supervisor is given a powerful control structure that may be reconfigured and adapted with high-level commands.

In order to perform a functional test of the system in its final application environment, a five channel PD control program PD.A.SM set forth hereinafter has been written in assembly language. This program has been written to be quite general purpose, so that it may be used in conjunction with the supervisory software when it is developed. The PD software is designed to operate the DCM in multiplexed mode, servicing from one to eight channels, although the external analog bussing implementation limits this to six channels. As written, this software always operates in multiplexed mode, even when only one channel is being controlled. Thus, it may be advantageous to also write a single-channel control program, since a very significant amount of the processor's time is being expended on the overhead associated with multiplexing.

Figure 13:
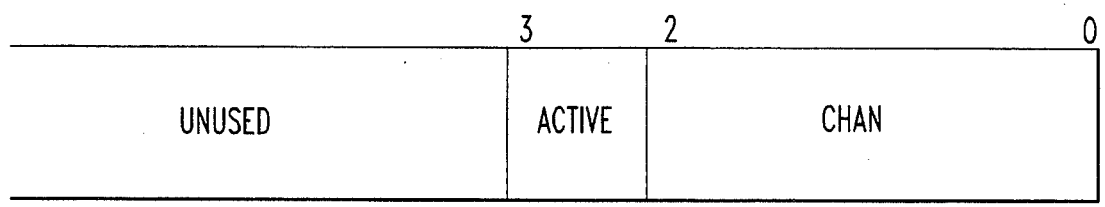
FIG. 13 is an analog input/output module control/status register format.

Because the DCM is operating in multiplexed mode, some way of determining which control channel should be serviced next is needed. One simple method would be for the DCM to start at the first channel and then increment the channel identifier during each pass through the control loop. This method is not appropriate for this particular architecture. Using this method would constrain the supervisor to assigning consecutive channels to multiplexed DCM's, and this would severely limit the flexibility with which the control channels may be assigned to the low-level controllers. A more flexible channel scheduling technique has been used here. The software uses a round-robin scheduling algorithm to determine which channels are to be serviced and the order in which they are to be serviced. Referring to FIG. 7, the round-robin channel scheduler is implemented with a scheduling queue residing in data RAM block 180. An auxiliary register 182 is used to point to the currently serviced channel at all times. Another register 184 is used as a counter so that when the end of the queue is reached, the program will reset the auxiliary register 182 to point to the first storage location for the queue. The correctly ordered channels are initially stored by the supervisor processor in program memory starting at the CHAN label (FIGS. 10 and 13). Upon power-up or reset, the DCM copies the initial queue contents from this program memory storage into on-chip block B0 referred to at 188. The contents of the queue may be easily modified by the supervisor once the DCM is operating by rewriting the external queue initialization memory and having the DCM copy this data into the internal queue. Likewise, the number of channels that the DCM is controlling is determined by the value in external RAM location MAXCH (see program including initial coefficients to be loaded into on-chip data). By changing these parameters in the external program memory, the supervisor may change the number of channels that the DCM is controlling, which channels it is controlling, and the order in which they are controlled.

The DCM software uses pipelining techniques to improve the maximum attainable sampling rate significantly. As previously discussed, sufficient time for the analog amplifiers, multiplexers, and sample-and-hold amplifiers to settle must be allowed after the DCM has been switched between channels. For the current implementation, this time is 1.5 $\mu$S. Since this waiting must occur during each pass through the loop before the A/D conversion is started and after the D/A conversion is started, a total of 3 $\mu$S must be devoted to waiting for the analog circuit components. Since the A/D conversion requires 2 $\mu$S, the D/A conversion requires 1 $\mu$S, and calculating the address of the next channel coefficients, resetting the watchdog timer, servicing the sampling rate interrupt, and calculating the next output sample require a total of 8 $\mu$S for the PD control algorithm, it is obvious that all of these operations must not be performed serially if the 100 KHz sampling rate specification is to be met. If performed serially, they would require over 14 $\mu$S, which is substantially worse than the 10 $\mu$S specification. The solution is to structure the software to exploit as much parallelism as the DCM architecture permits and to use pipelining techniques in the analog interface circuitry.

Figure 16:
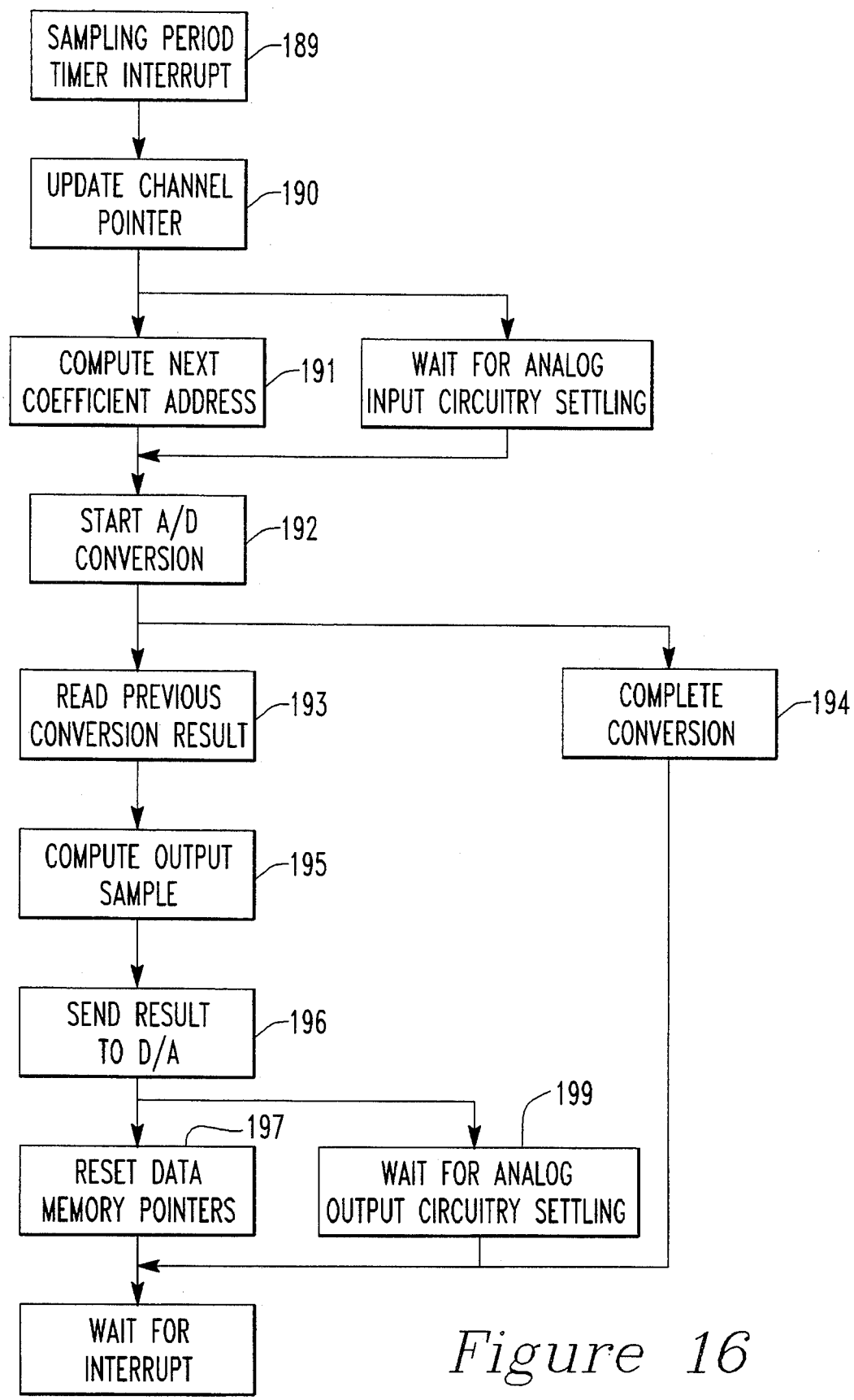
FIG. 16 is a flow chart illustrating the digital control for the system of the present invention.

The basic concept of pipelining is shown in the control code flowchart of FIG. 16, and it is similar to pipelining as applied to a purely digital system. Referring to FIG. 16, a timer interrupt defines each sampling period at block 189, and the channel pointer is updated at block 190, and the next coefficient address is computed at block 191. After the settling time of the analog input circuitry, the A/D conversion is stored at block 192. Then the previous A/D conversion result is read at block 193, and the output sample computed at block 195. Subsequent to block 192, the conversion is completed as noted at block 194. The result is transmitted to D/A converter 124 (see FIG. 6) as noted at block 196. The data memory pointers are then reset at block 197; and the system waits for the next interrupt at 198 to report the sequence. Settling of the analog output circuitry is awaited at block 199. The basic concept of pipelining is that during each pass through the control loop, the A/D conversion being performed at 193 and 194 provides an input for the next pass. When complete, the conversion result is stored in the A/D converter's output latches until the DSP chip requests the result. Since the conversion result at 193 is not required during the current pass, the conversion and the waiting may proceed in parallel with the coefficient address and output sample calculations. Although all of the waiting is still being performed to allow the analog components to settle, this waiting occurs in parallel with useful control computations. The major disadvantage of this method is that when pipelining is combined with multiplexing, the system analog outputs and inputs are shifted relative to each other. For example, system output C will correspond to input B, assuming a one stage pipeline like the one just described (see FIG. 3). Since the pipelining adds a time delay to the control system, it also introduces some phase lag. However, the time delay is 10 µS, which is insignificant compared to delays currently contained in the external power amplifier, probe amplifiers, and other system components. Additionally, since the serial intercommunication busses are steered by the same decoded CSR output that the analog multiplexers are, the serial inputs and outputs arriving at each DCM will also be shifted by one channel number. Provided that the software is each DCM has been written to account for this, then no problem exists. The complications arising from the use of pipelining are well worth the gain in sampling rate. Using this strategy, the system sampling rate has been improved to meet the 100 KHz specification.

Although not currently implemented, the tasks that the supervisory software will have to perform may be discussed at this point. Basically, the supervisory software must perform the user interface, adaptation, and fault tolerance management functions.

The user interface section should present a friendly, menu-driven interface to the system user to ease both software development and use of this controller in digital control research. The initial user interface software module should allow the user to choose from among different control algorithms, possibly different ones for each control channel. The PD controller described in the previous section could be used without modification in conjunction with the supervisory software, and it may be readily expanded to implement any type of control algorithm that is computed using linear difference equations. Next, the user must be able to specify controller gain parameters for each channel. If identical gains are desired on all channels, then there should be a provision for a universal gain set to save considerable effort on the part of the user. As one additional option, the user should be able to specify which channels are to be controlled by which DCM's. Normally, all of the controller parameters are entered with physical channel numbers without reference to a particular DCM. In normal operation, the supervisor must determine how many DCM's are present in the system and allocate the control tasks appropriately among the available processors. However, forcing certain channels to be controlled by specific DCM's may be of use in future software or hardware development. Finally, the user should be able to change any of the parameters at any time. Therefore, there should be a provision for the user to enter new parameters while the controller is in use.

The supervisor must also coordinate the fault tolerance algorithms implemented in the system as well as managing low-level processor reconfiguration. In support of this task, the supervisor must initially assign the physical control channels among the available DCM's upon system initialization. When DCM's drive the VME bus $\overline{\text{SYSFAIL}}$ line low indicating that a failure has occurred, then the supervisor must poll each DCM to see which one has the FAIL bit of its CSR set (see I/O definitions of program listing). When the correct DCM is found, it is placed in a special diagnostic mode, where it will test its memory, the integrity of its arithmetic unit, its serial intercommunications hardware, and all analog components in its signal path, including those on the analog I/O module. Since all of the memory and I/O devices on each DCM are available to the VME bus master, the supervisor may also perform its own diagnostic tests of the suspected DCM. Upon the detection of a DCM fault, the supervisor may take several courses of action. To prevent transient errors from having a permanent impact on the structure and the throughput of the system, it will likely be desirable to allow a certain number of faults to occur on a particular DCM before it is considered unreliable enough to shut it down. This will also permit a straightforward implementation of the pump-up technique discussed previously to make the system insensitive to the occasional miscompares that will occur with any type of fault detection scheme that uses comparisons of A/D conversion results. When it is determined that a permanent failure has occurred, then the faulty processor is shut down and its control responsibilities divided among the other available processors.

The following describes the purpose and function of the various programs indicating a listing of each.

PD.ASM may be easily modified to implement algorithms other than a simple PD controller. This modification may be accomplished by modifying the MAXCH parameter to be one less than the number of channels to be controlled. In addition, PD.ASM has been designed to run properly with the supervisory software. By storing all relevant parameters in the external program RAM initially, the supervisor may change these parameters and inform the DSP chip of this action through the CSR.

TEST1.ASM

This program simply samples the analog input and reconverts the result into analog format without doing any intermediate processing. TEST1.ASM has been used in the initial system development and testing.

MULTI.ASM

This program multiplexes channels 1 and 2. It is designed to be used to check proper operation of the DCM multiplexing and the analog I/O board sample-and-hold amplifiers. Crosstalk was also measured while the DCM was running MULTI.ASM.

DNLD.ASM

DNDL.ASM is the DCM program that is executed out of EPROM upon system power-up or reset. DNLD performs a partial DSP chip initialization and it then waits for a sampling period clock interrupt. When the interrupt occurs, then a new iteration through the control loop in started.

DNLD works by simply checking the ACTIVE bit of the CSR. When ACTIVE becomes true, DNLD forces program execution to transfer to address 0x2000 (hexadecimal), which is the first location in the external program RAM.

FILTER2.ASM

Filter2 is a length 41 FIR digital filter. This program has been used to test the overall system. It has been used as an evaluation tool only, not as a control algorithm.

```
*-----------------------------------------------------------------
*
*                           PD.ASM
*
*   This program implements a multiplexed five channel PD type digital
*   controller for use with magnetic bearings.  The actual control code
*   and coefficients are copied fromt he external memory space into
*   on-chip memory to be executed.
*
*-----------------------------------------------------------------

INIT    RORG    >0000
        DINT
        SOVM
        SSXM
        LDPK    0
        SPM     2
        LARP    AR4
        LARK    AR4,GREG        * Clear GREG to make all memory local
        ZAC
        SACH    *-
        LACK    1               * Set IMR to enable INT0
        SACL    *

*-----------------------------------------------------------------
*
*   Load time critical control code from external program memory into fast
*   internal memory block B2.
*
*-----------------------------------------------------------------

LARP    AR1
        LRLK    AR1,BLK0
        RPTK    PROGL-1
        BLKP    PROG,*+

*-----------------------------------------------------------------
*
*   Copy coefficients into internal memory
*
*-----------------------------------------------------------------

LDPK    6
        LRLK    AR1,BLK1+COEFF
        RPTK    COEFL-1
        BLKP    COEF,*+
        CNFP
*-----------------------------------------------------------------
*
*   Initialize the 8254 timer chip.
*   It is assumed here that the timer is operating on a 200 nS clock.
*   The internal TMS320C25 timer is currently unused.  The timers are
*   used as follows:
*
*       Timer 0 :
*                Mode 0, LSB of count only is loaded.  This is
*                the watchdog timer.  It must be reset at least
*                once during its timing period or else it will set
*                the FAIL bit of the CSR, turn on the FAIL LED, and
*                interrupt the VME bus master.
*
*       Timer 1 :
*                Interrupts the TMS320C25 at level INT0.  This timer
*                is intended to be used to set the sampling rate.  It
*                operates in mode 2, with only the LSB of the count
*                loaded.
*
```

```
*         Timer 2:
*                  Currently unused.  Timer 2 interrupts the TMS320C25
*                  at level INT1.
*
*------------------------------------------------------------------

TINIT   LDPK    64              * 8254 base address
                LACK    >18             * Channel 0 control word
                SACL    TIMER
                LACK    WATCH           * Initialize watchdog
                SACL    COUNT0
                LACK    >54             * Channel 1 control word
                SACL    TIMER
                LACK    SAMRAT
                SACL    COUNT1          * Initialize sampling rate
                LDPK    6

*------------------------------------------------------------------
*
* Get ready and go execute control code in internal RAM
*
*------------------------------------------------------------------

LALK    MAXCH           * Initialize maximum channel word
                SACL    NUMCH
                LALK    ORDER
                SACL    LENGTH
                LARP    AR1             * Point AR1 to scheduling queue
                LRLK    AR1,QUEUE+BLK1
                RPTK    CHANL-1         * Initialize scheduling queue
                BLKP    CHAN,*+
                LAR     AR0,LENGTH
                LRLK    AR1,QUEUE+BLK1
                LRLK    AR2,MAXCH
                LRLK    AR3,XN0+BLK1
                LALK    >FF00
                BACC                    * Branch to internal program RAM
                MACD    >FF00+COEFF,*-
                APAC
                SACH    FILOUT,0
                B       BEGIN
        PROGE   EQU     $
        PROGL   EQU     PROGE-PROG
        ATOD    EQU     >1
        STRTAD  EQU     >0
        DTOA    EQU     >2
        BEGIN   EQU     >FF00
*
        COEF    DATA    -130,-165,-130,0,219,466,642,631,346,-213,-941,-1616,-1950
                DATA    -1658,-556,1369,3914,6680,9196,10940,11565,10940,9196,6680
                DATA    3914,1369,-556,-1658,-1950,-1616,-941,-213,346,631,642,466
                DATA    219,0,-130,-165,-130
        COEFE   EQU     $
        COEFL   EQU     COEFE-COEF
*
        BLK0    EQU     >200
        BLK1    EQU     >300
*
                DORG    5
        GREG    BSS     1
*
                DORG    0
        B0      BSS     PROGL
        COEFF   BSS     COEFL           * coefficient storage in internal RAM
*
                DORG    0
        ONE     BSS     1               * Holds the value 1
```

```
FILOUT  BSS      1                      * Storage for filter output
FILIN   BSS      1                      * Storage for filter input
SIGNAL  BES      38                     * Storage for previous inputs
DUMMY   BSS      1
        END
```

```
*---------------------------------------------------------------
*
*                       FILTER2.ASM
*
* This program implements a FIR-type digital filter.  The filter code is
* and the coefficients are copied into internal RAM for maximum execution
* speed.  This program is based on the example on pp. 5-12 to 5-13 of
* the Texas Instruments TMS32020 User's Guide
*
*---------------------------------------------------------------

RESET   RORG     >0000
        B        >2020
*

*Initialize processor
*
*
INIT    RORG     >0040
*
        SOVM                            * Initialize CPU and set all
        SSXM                            * memory to local mode
        LDPK     0
        SPM      0
        LARP     AR4
        LARK     AR4,GREG
        ZAC
        SACH     *

*---------------------------------------------------------------
*
* This code copies filter program and coefficients into on-board RAM
*
*---------------------------------------------------------------

LARP     AR1
        LRLK     AR1,BLK0
        RPTK     PROGL-1
        BLKP     PROG->20,*+
        LDPK     6
        LACK     1
        SACL     ONE
        LRLK     AR1,BLK0+PROGL
        RPTK     COEFL-1
        BLKP     COEF->20,*+
        CNFP
        LALK     >FF00
        BACC

*---------------------------------------------------------------
*
*       DIGITAL FILTER ALGORITHM
*
*---------------------------------------------------------------

PROG    EQU      $
START   OUT      FILOUT,DTOA
        IN       FILIN,ATOD
        IN       DUMMY,STRTAD
        LRLK     AR1,BLK1+SIGNAL
        ZAC
        MPYK     0
        RPTK     40
```

```
        RORG    0

*------------------------------------------------------------------
*
*                        MULTI.ASM
*
*  This program operates channels 1 and 2 of the DCM in multiplexed
*  mode to test operation of multiplex mode and to measure crosstalk.
*
*------------------------------------------------------------------

RESET   LDPK    0                       * Configure all memory as local
        LARP    AR4
        LRLK    AR4,GREG
        ZAC
        SACH    *
        LARP    AR1
        LRLK    AR1,DRAM
LOOP    LACK    >08                     * Channel 0
        SACL    *
        OUT     *,CSR
        RPTK    >10
        NOP                             * Write initial control word
        IN      *,ATODST                * Start A/D
WAIT1   BIOZ    WAIT1                   * Wait for A/D
        IN      *,ATODRD                * Get new input
        OUT     *,DTOAST                * and ship it to D/A
        RPTK    >10                     * Wait for D/A and S/H to settle
        NOP
        LACK    >09                     * Channel 1
        SACL    *
        OUT     *,CSR
        RPTK    >10
        NOP                             * Write channel 1 control word
        IN      *,ATODST                * Start A/D
WAIT2   BIOZ    WAIT2                   * Wait for A/D
        IN      *,ATODRD                * Get new input
        OUT     *,DTOAST                * and ship it to D/A
        RPTK    >10
        NOP                             * Wait for analog settling
        B       LOOP

DORG    0
GREG    BSS     1

*
* Various definitions
*

ROM0    EQU     >0000                   * Base address of program EPROM
DRAM    EQU     >1000                   * Base address of data RAM
PRAM    EQU     >2000                   * Base address of program RAM
CSR     EQU     >08                     * I/O address of CSR
ATODST   EQU    >00                     * I/O address to start A/D
ATODRD   EQU    >01                     * I/O address to read A/D
DTOAST   EQU    >02                     * I/O address of D/A buffer
```

*------------------------------------------------------------------
*
*                        TEST1.ASM
*
*  This program tests the A/D and D/A conversion by sampling the input
*  pointed to by the CSR and reconverting the unprocessed sample to
*  analog format.
*
*------------------------------------------------------------------

```
        RORG    0
        LDPK    10              * Use external RAM as scratchpad
RESET   OUT     NUMBER,2        * Output last sample to D/A
        IN      NUMBER,1        * Read A/D
        IN      NUMBER+1,0      * Start A/D
        RPTK    >10             * and wait for it to finish
        NOP
        B       RESET
*
NUMBER  EQU     0
        END
```

*----------------------------------------------------------------
*
*   Miscellaneous definitions
*
*----------------------------------------------------------------

```
WATCH   EQU     100             * # of 200 nS ticks in watchdog period
SAMRAT  EQU     60              * # of 200 nS ticks in sampling period
ORDER   EQU     2               * Order of difference equation implemented
        END
XNM10   BSS     1
DUMMY   BSS     1
QUEUE   BSS     CHANL           * Storage for the scheduling queue
NUMCH   BSS     1               * Number of channels serviced
WDTIME  BSS     1               * Storage for watchdog period
COEFB   BSS     1
COEFF   BSS     COEFL           * Coefficient storage
CHNUM   BSS     1
LENGTH  BSS     1               * Stores difference equation order
```

*----------------------------------------------------------------
*
*   Internal memory constants
*
*----------------------------------------------------------------

```
BLK0    EQU     >200            * Internal data RAM block 0
BLK1    EQU     >300            * Internal data RAM block 1
```

*----------------------------------------------------------------
*
*   External memory constants
*
*----------------------------------------------------------------

```
MBOX    EQU     >1000           * Start of mailbox in data RAM
DRAM    EQU     >0000
PROM    EQU     >0000
PRAM    EQU     >2000
```

*----------------------------------------------------------------
*
*   I/O address definitions
*
*----------------------------------------------------------------

```
ATODST  EQU     0               * Start A/D
ATODRD  EQU     1               * Read from A/D
DTOAST  EQU     2               * Output to D/A
SR0     EQU     3               * Shift register 0
SR1     EQU     4               * Shift register 1
SR2     EQU     5               * Shift register 2
SR3     EQU     6               * Shift register 3
SR4     EQU     7               * Shift register 4
CSR     EQU     8               * Command/status register
```

```
FAIL    EQU     9                       * Set fail flop-flop
SO      EQU     10                      * Serial output

*----------------------------------------------------------------
*
*   Timer I/O address definitions
*
*----------------------------------------------------------------

DORG    0
COUNT0  BSS     1                       * Timer 0 count
COUNT1  BSS     1                       * Timer 1 count
COUNT2  BSS     1                       * Timer 2 count
TIMER   BSS     1                       * 8254 control word
READ0   BSS     1                       * Timer 0 read back
READ1   BSS     1                       * Timer 1 read back
READ2   BSS     1                       * Timer 2 read back

*----------------------------------------------------------------
*
*   Initial coefficients to be loaded into on-chip data RAM
*
*----------------------------------------------------------------

COEF    EQU     $
KD5     DATA    18432           * KP = 2.5
KP5     DATA    -18688          * KD = 4.0 For all channels
KD4     DATA    18432
KP4     DATA    -18688
KD3     DATA    18432
KP3     DATA    -18688
KD2     DATA    18432
KP2     DATA    -18688
KD1     DATA    18432
KP1     DATA    -18688
COEFE   EQU     $
CHANB   EQU     $
CHAN    DATA    >08,>09,>0A,>0B,>0C
CHANE   EQU     $
COEFL   EQU     COEFE-COEF
CHANL   EQU     CHANE-CHANB
MAXCH   EQU     3

*----------------------------------------------------------------
*
*   Data memory page 0 definitions
*
*----------------------------------------------------------------

GREG    EQU     >05

*----------------------------------------------------------------
*
*   Data memory page 4 definitions
*
*----------------------------------------------------------------

DORG    0
B0      BSS     PROGL

*----------------------------------------------------------------
*
*   Data memory page 6 definitions
*
*----------------------------------------------------------------

DORG    0
YN4     BSS     1                       * Channel 4 output storage
XN4     BSS     1                       * Channel 4 current input
```

```
XNM14   BSS     1                       * Channel 4 previous input
YN3     BSS     1                       * and so on for the other channels
XN3     BSS     1
XNM13   BSS     1
YN2     BSS     1
XN2     BSS     1
XNM12   BSS     1
YN1     BSS     1
XN1     BSS     1
XNM11   BSS     1
YN0     BSS     1
XN0     BSS     1
```

*----------------------------------------------------------------
*
*   This is the actual digital control loop. Currently, a five degree
*   of freedom digital PD type controller is implemented. The controller
*   may be multiplexed among from 1 to the maximum 8 possible channels,
*   although only five are currently supported. A simple digital PD
*   type controller is implemented. The transfer function of this
*   controller is
*
$$C(z) = (K_p + K_d/T)R(z) - (K_d/T)R(z)z^{-1}$$
*
*   which is implemented by the difference equation
*
$$c_n = (K_p + K_d/T)r_n - (K_d/T)r_{n-1}$$
*
*----------------------------------------------------------------

```
PROG    EQU     $
CNTL    EINT
        OUT     *+,CSR,AR3              * Output next channel ID to CSR
        SAR     AR2,CHNUM
        LDPK    64                      * Reset watchdog timer
        LACK    WATCH
        SACL    COUNT0
        LDPK    6
        LALK    COEFF+BLK1              * Compute address of next coefficients
        ADD     CHNUM,1
        SACL    COEFB
        LAR     AR4,COEFB
        ZAC                             * Clear multiplier input registers
        MPYK    0
        IN      *+,ATODRD               * Read previous A/D result
        IN      DUMMY,ATODST            * Start A/D converter
        LTD     *-,AR4                  * Calculate new output sample
        MPY     *+,AR3
        LTD     *-,AR4
        MPY     *+,AR3
        APAC
        SACH    *,1
        OUT     *0-,DTOAST,AR2          * Output to D/A
        BANZ    STOP+OFFSET,*-,AR1      * See if we just serviced last channel
        LRLK    AR1,QUEUE+BLK1          * If so, reset memory pointers
        LRLK    AR2,MAXCH
        LRLK    AR3,XN0+BLK1
STOP    IDLE                            * and wait for next sampling interrupt
PROGE   EQU     $
PROGL   EQU     PROGE-PROG
DIFF    EQU     >FF00->2000
OFFSET  EQU     DIFF-PROG
```

A detailed description of a degradable performance fault tolerant digital controller for active magnetic bearings as heretofore outlined is described in detail in the document entitled "Fault Tolerant Multiprocessor Digital Control System Design For Active Magnetic Bearings", written by S. W. Yates, R. D. Williams and R. R. Humphris, Department of Mechanical and Aerospace Engineering, University Of Virginia, Charlottesville, Va. 22901, which document consists of pages 1 through 178 inclusive, which are incorporated herein by reference as though set forth at length herein.

A more detailed description of the diagnostic and control features of the present invention is set forth in our publication entitled "Diagnostic and Control Features With Magnetic Bearings" presented at 1989.

By injecting the appropriate frequency and amplitude of a sine wave into the perturbation inputs of the two horizontal power amplifiers and the same sine wave, but now shifted by 90° in phase, into the corresponding two vertical perturbation inputs, a rotating disturbance or force field is created.

The current in the electromagnets is now changed from a fixed bias value to a modulated or sinusoidally varying current which in turn creates a sinusoidal magnetic field.

The 90° phase shift between the currents in the vertical and horizontal directions thus creates a rotating magnetic force field, causing the rotor to move in an orbit. By selecting the proper amplitudes and frequencies of the sine waves, valuable information about the characteristics of the magnetic bearing system may be obtained by monitoring the displacement probe signals. This rotating force field may be considered a rotating unbalance force with a constant amplitude as the frequency is changed.

A signal of white noise, which contains all frequencies of interest, may likewise be injected into any combination of the power amplifier perturbation inputs to modify the current and thus the magnetic fields operating on the support of the rotor. A signal analyzer, using a fast fourier transform (FFT) and monitoring the rotor displacement signals, can then quickly give the frequency spectrum response of the overall system.

A perturbation signal consisting of a step or low frequency square wave may also be utilized. Again, by observing the real time response of the displacement probes, information such as damping factor, log decrement, damped natural frequency or first critical speed and general stability behavior may be easily obtained.

The use of a sine wave as a perturbation signal for one axis at a time is similar to that of the rotating force field signal described above, except that the 90° phase shifted signal component is not used. Most of the same type of information may be gathered, but orbiting of the rotor will not occur.

Before a magnetic bearing system is ever run, whether installed or on a test stand, the overall system behavior and characteristics may be determined and optimized control settings can be made.

After stable support of a new magnetic bearing system has been achieved, it would be most valuable to know the system response to varying the proportional and derivative gains of the controller. These affect the system stiffness and the damping respectively. The top curves of FIGS. 20A, B show the stationary rotor response to a rotating force field applied to both magnetic bearings in phase as the frequency is increased from about 3 Hz to about 66 Hz (200 to 4000 RPM) and the derivative gain is set at three different values.

Compensated amplitude response of horizontal midspan to (1) rotating force field applied to a stationary rotor and (2) normal runup forces, for a constant proportional gain=1.4 and varying derivative gains (damping). Note that one major resonance of the rotor system or critical speed occurs at about 1150 RPM with a minor resonance at 800 RPM. The increasing derivative gain, or damping, causes the peak amplitude response to decrease. Immediately after the stationary rotor tests were completed, response curves were generated for the actual rotor runup in speed for the same three derivative gain settings as shown in the bottom set of curves of FIGS. 20A, B. The two sets of curves are very similar in both shape and relative amplitude, showing the same major critical frequency. Even the minor response at 800 RPM is indicated in both curve sets and this has been identified as a structure resonance. Also, it is obvious that the amplitude of the runup response curves are increasing slightly with speed as the third critical is approached. This is due to the "$\omega^2$" component of force in the generalized equation of motion and this term is not present in the rotating force field stationary test. All the curves in FIGS. 20A, B have been compensated, i.e., the slow roll amplitude and phase at 200 RPM have been subtracted from the raw data. Phase information is available for both sets of curves and similar phase changes are indicated as the criticals are traversed.

Figure 21:
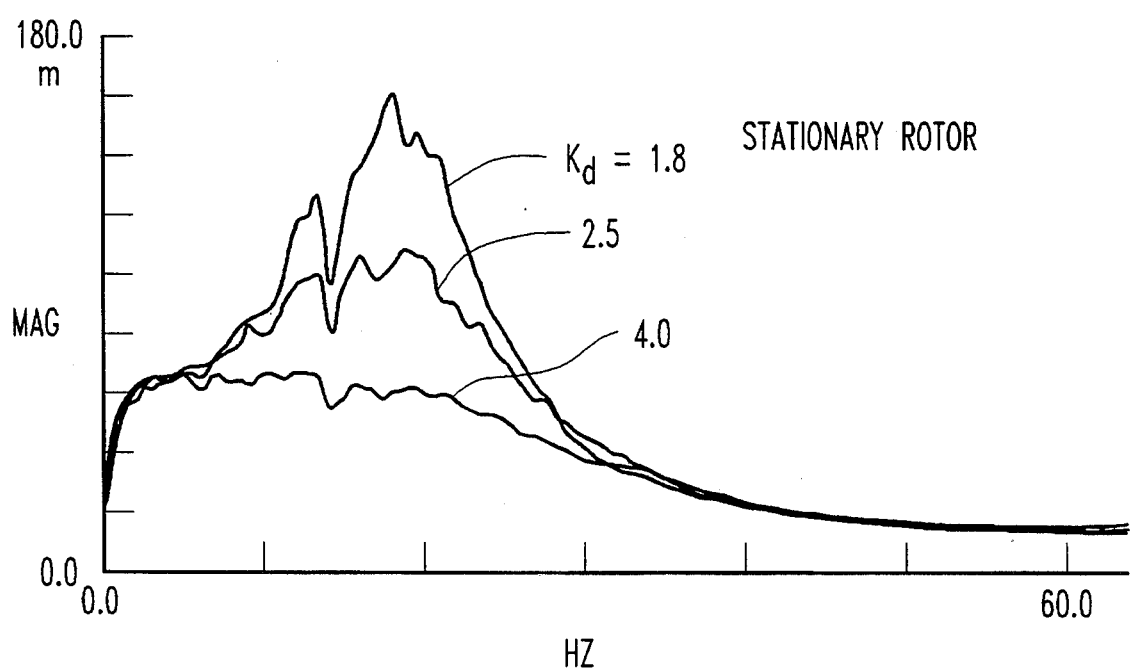
FIG. 21 is a graphical representation of white noise response of a stationary rotor at horizontal midspan for a constant proportional gain=1.4 and varying derivative gains.

FIG. 6 shows three curves of 300 averages each, of the frequency response to the stationary rotor to a white noise perturbation signal, for the same controller settings as used for FIG. 21. The general curve shapes are similar, with the large first rotor critical at the same frequency and the structure resonance at 13 Hz (~80 RPM).

White noise response of stationary rotor at horizontal midspan for a constant proportional gain=1.4 and varying derivative gains.

Figure 20A:
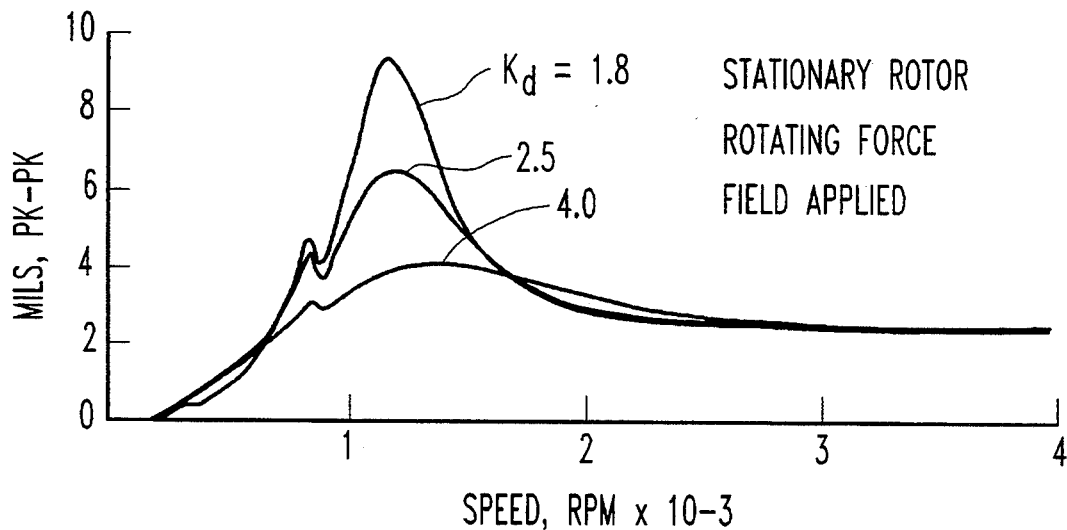
FIGS. 20A and 20B are graphic representations of compensated amplitude response of horizontal midspan to rotating force field applied to a stationary rotor, and normal run up forces, for a constant proportional gain=1.4 and varying derivative gains (damping)
Figure 20B:
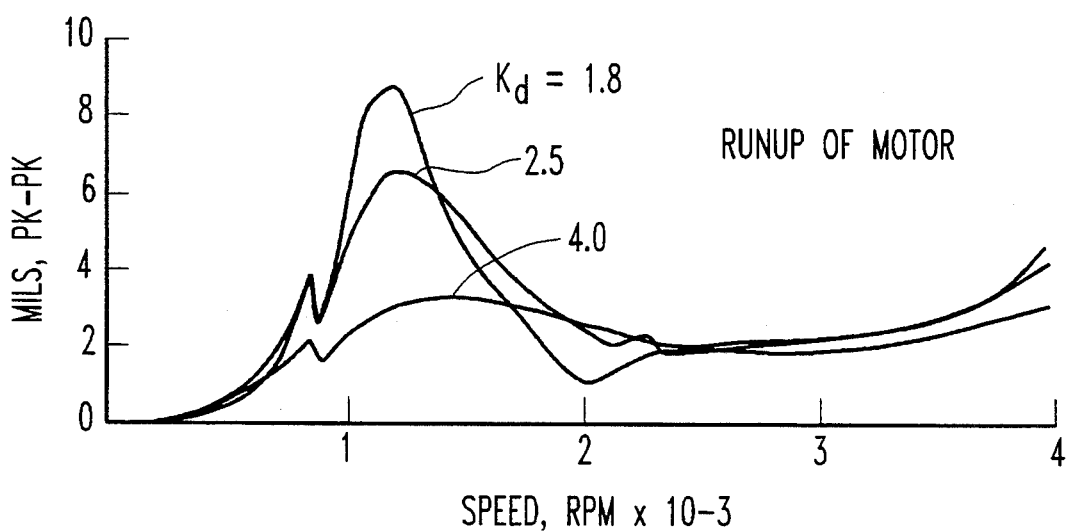
Figures 22A, 22B, 22C:
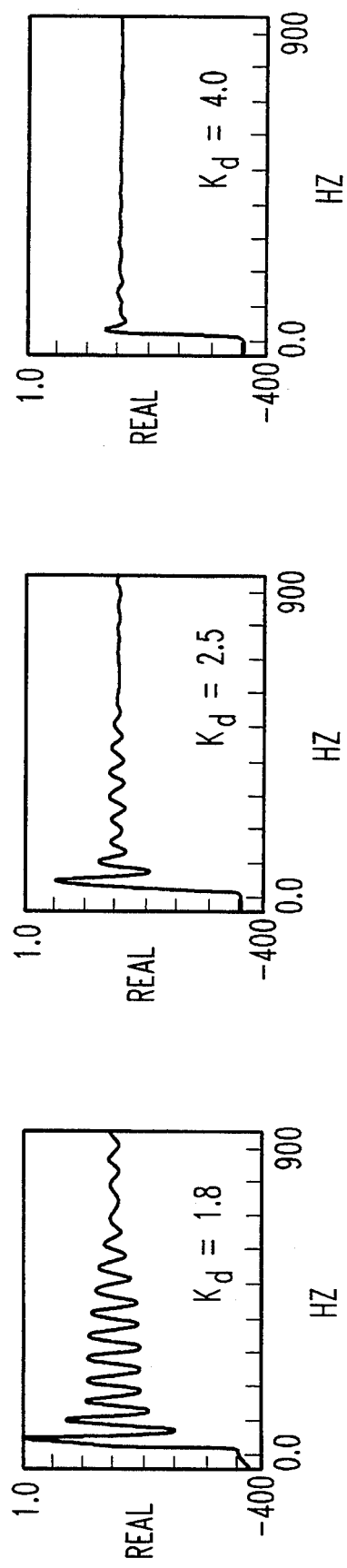
FIGS. 22A, 22B, and 22C are graphical representations of step response of stationary rotor at horizontal midspan for constant proportional gain=1.4 and varying derivative gains.

The response of the stationary rotor to a step function or force is shown in FIGS. 22A–C for a constant proportional gain and three different derivative gain settings, the same as in FIGS. 20A, B and 21. The effect of increased damping in reducing the step overshoot is readily seen. The left step response indicates very low damping with the large overshoot and long time for the decay of the oscillations. The nonexponential decay of oscillations suggests that higher order forces or influence of other higher criticals may also be present, which is indeed true, as will be shown later. The frequency of these oscillations may be used in determining the approximate location of the first rotor critical.

Step response of stationary rotor at horizontal midspan for constant proportional gain=1.4 and varying derivative gains.

Figure 23A:
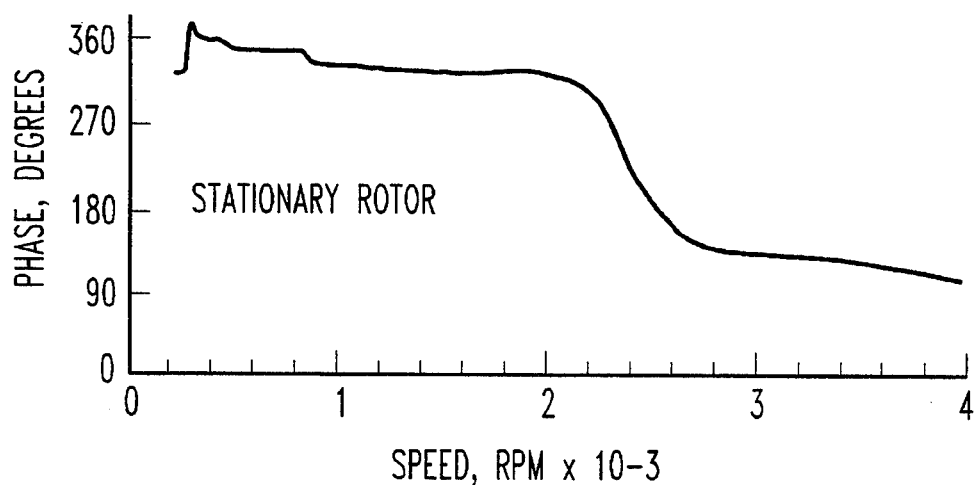
FIGS. 23A, 23B, and 23C are graphical representations of compensated amplitude response of horizontal midspan to rotating force field applied to a stationary rotor and normal runup forces, for a constant derivative gain=5.0 and varying proportional gains (stiffness), respectively.
Figure 23B:
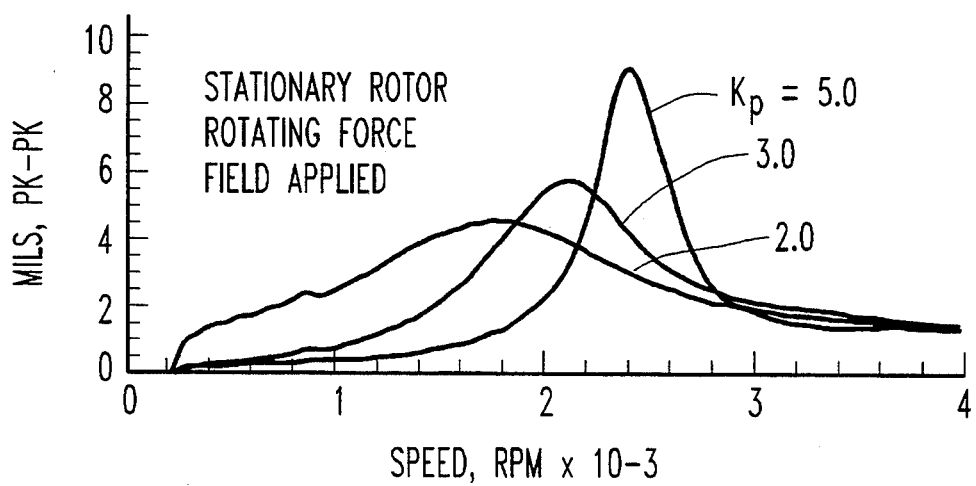
Figure 23C:
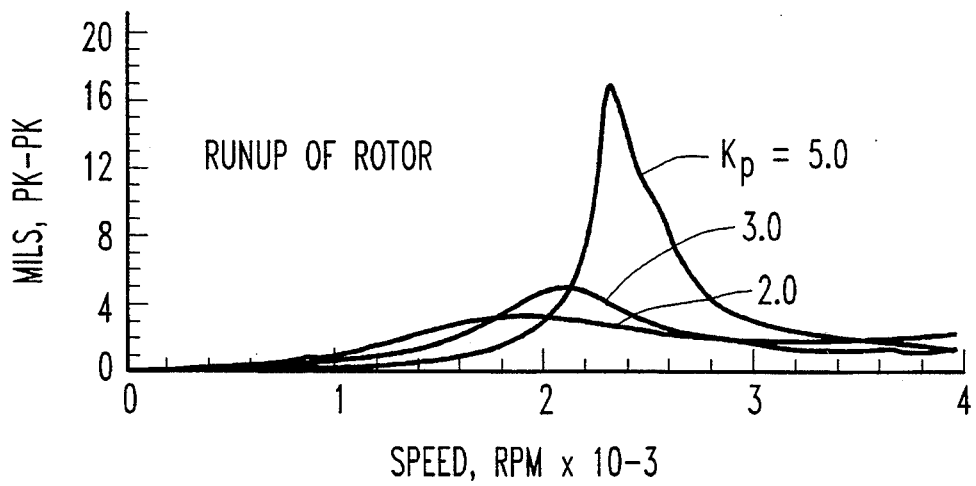
Figure 24:
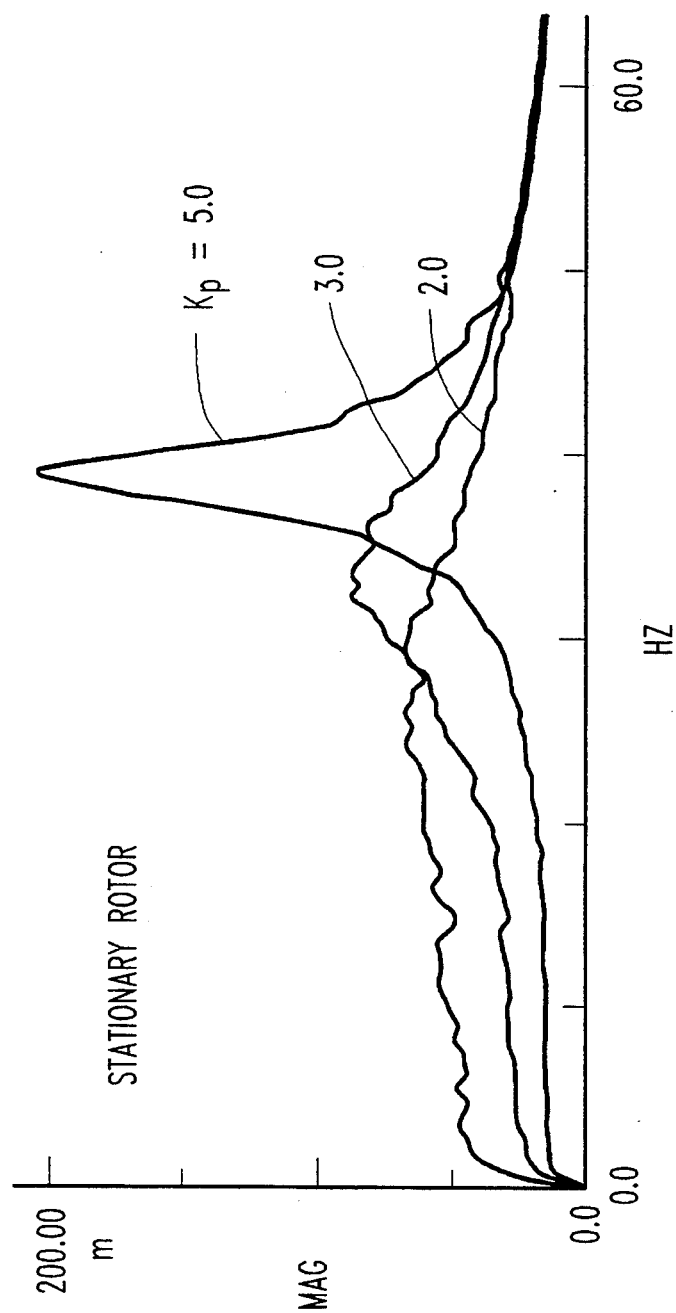
FIG. 24 is a graphical representation of white noise response of stationary rotor at horizontal midspan for constant derivative gain=5.0 and varying proportional gain.

The same types of tests as mentioned above were repeated but now, keeping the derivative gain or damping constant and varying the proportional gain or stiffness. FIGS. 23A–C shows the response curves using the rotating force field method with a stationary rotor and the actual runup response. The strong similarity of the two sets of curves is noted, with the differences in relative peak amplitudes due to the additional "$\omega^2$" force term occurring in the actual rotating runup curves. However, frequencies of peak amplitudes are comparable and it is seen that as the magnetic bearing stiffness is increased, as expected, the frequency of the peak also increases. The response of the stationary rotor to white noise for these same parameter settings is shown in FIG. 24 and it gives the same general trends and shapes as seen in FIGS. 23A–C.

Figure 25C:
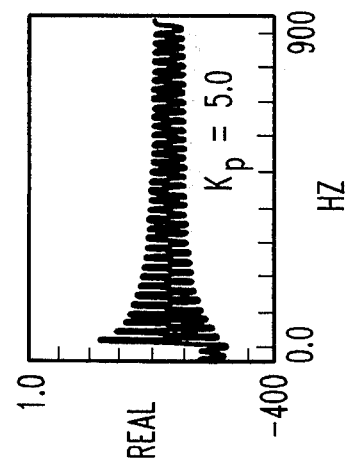
FIGS. 25A, 25B, and 25C are graphical representations of step response of stationary rotor at horizontal midspan for constant derivative gain=5.0 and varying proportional gain.
Figure 25B:
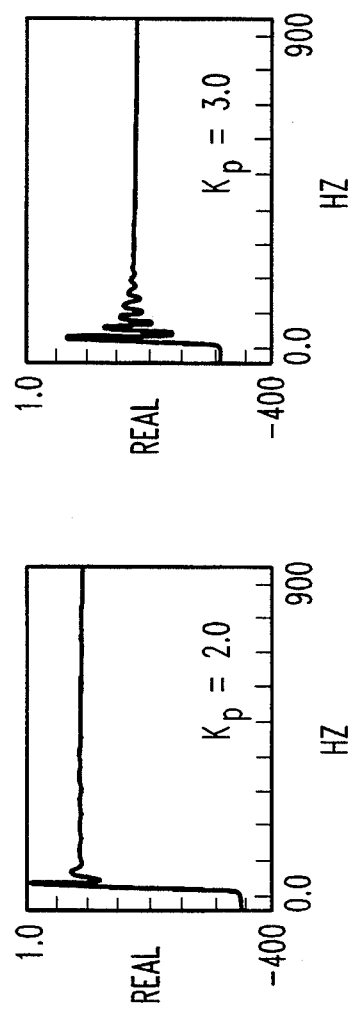
Figure 25A:
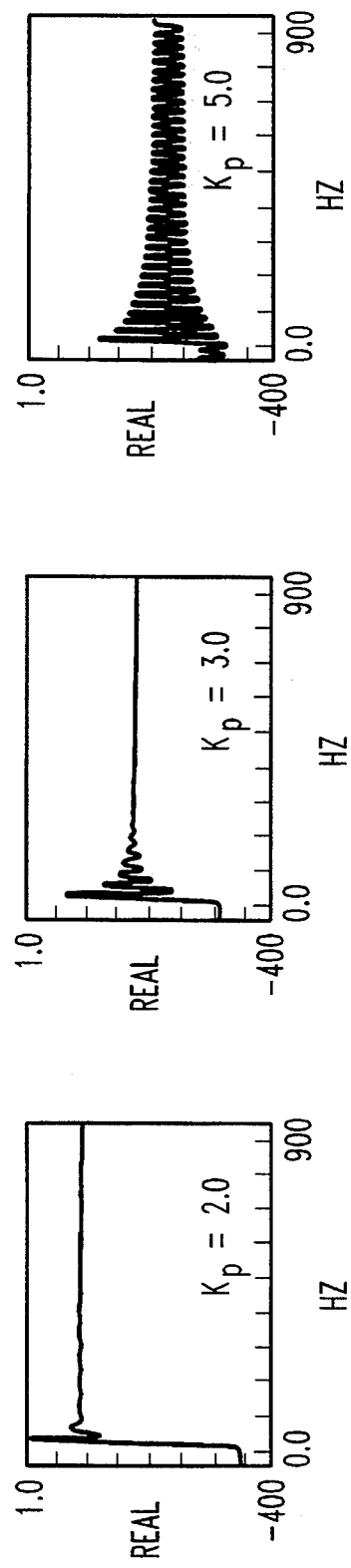

The step response for the same proportional gain settings is shown in FIG. 25. Here it is noted that as the stiffness is increased, the effective damping appears to decrease, resulting in more oscillations, and at Kp=5, the system becomes marginally stable, with a constant level of oscillation. If this stiffness was required for operation, then the derivative gain must be increased for a more stable behavior. Also note that, as expected, the final average amplitude of the step decreases as the stiffness increases. If the gap separation distance is known and by measuring the electromagnet currents before and after the step, enough information is available so that the effective stiffness may be calculated.

White noise response of stationary rotor at horizontal midspan for constant derivative gain=5.0 and varying proportional gain.

Step response of stationary rotor at horizontal midspan for constant derivative gain=5.0 and varying proportional gain.

Figure 26A:
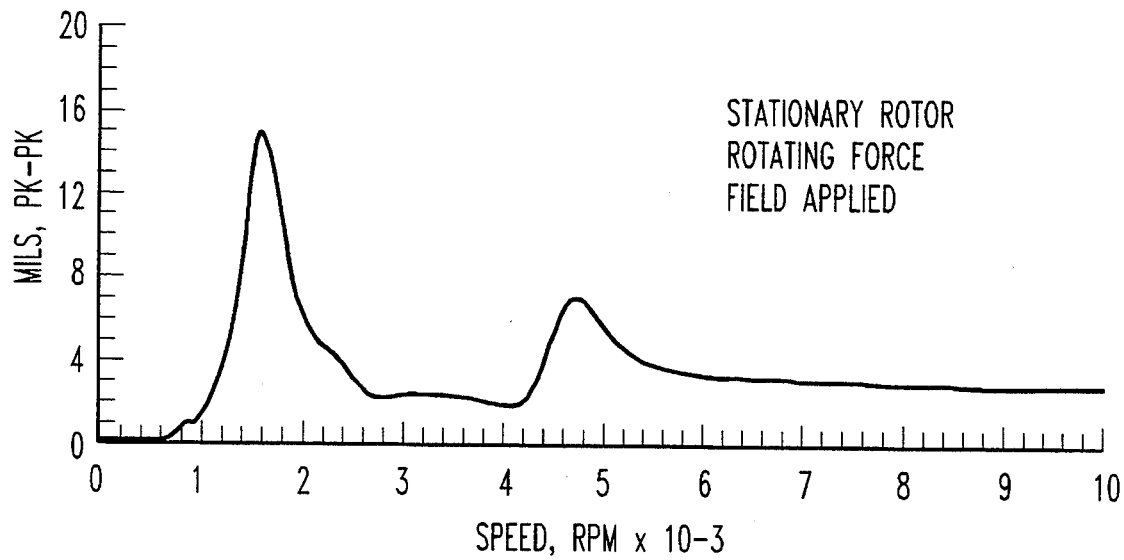
Figure 26B:
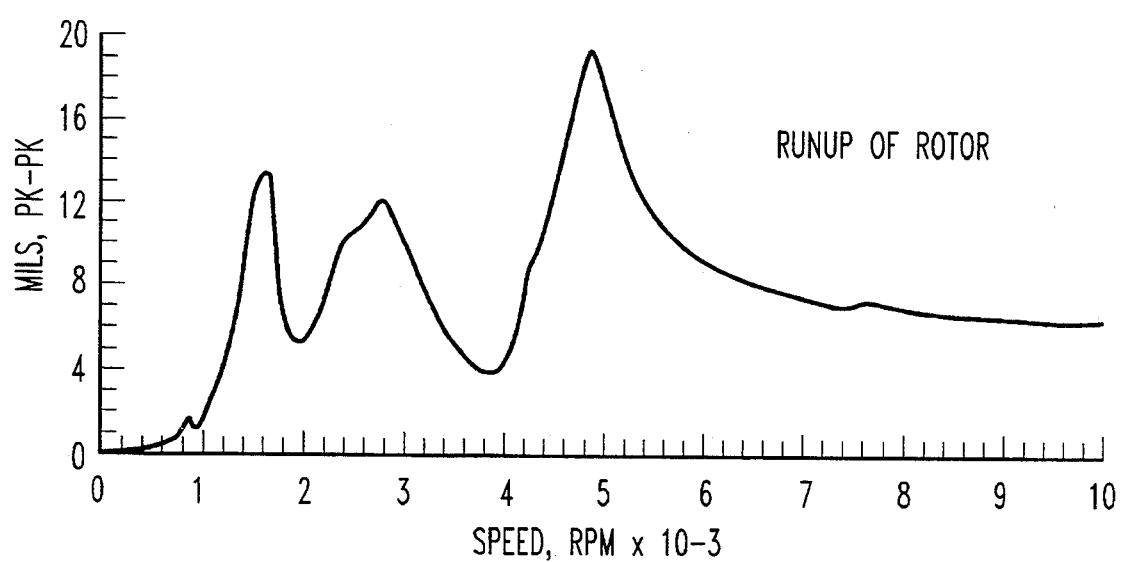

The data discussed so far has included results up to 4000 RPM and only for the midspan horizontal probe. FIGS. 26A, B shows the amplitude response of the outboard horizontal probe up to 10,000 RPM for both the actual runup case and for the stationary rotor with the rotating force field applied. The proportional and derivative gains were identical for each with $K_p=K_d=2.0$. Again, the runup curve shows the effect of the "$\omega^2$" term, which drives the response at the higher speeds. Indeed, the second critical is not observed with the rotating field method, but the location of the first and third criticals of each curve closely agree.

Figure 27:
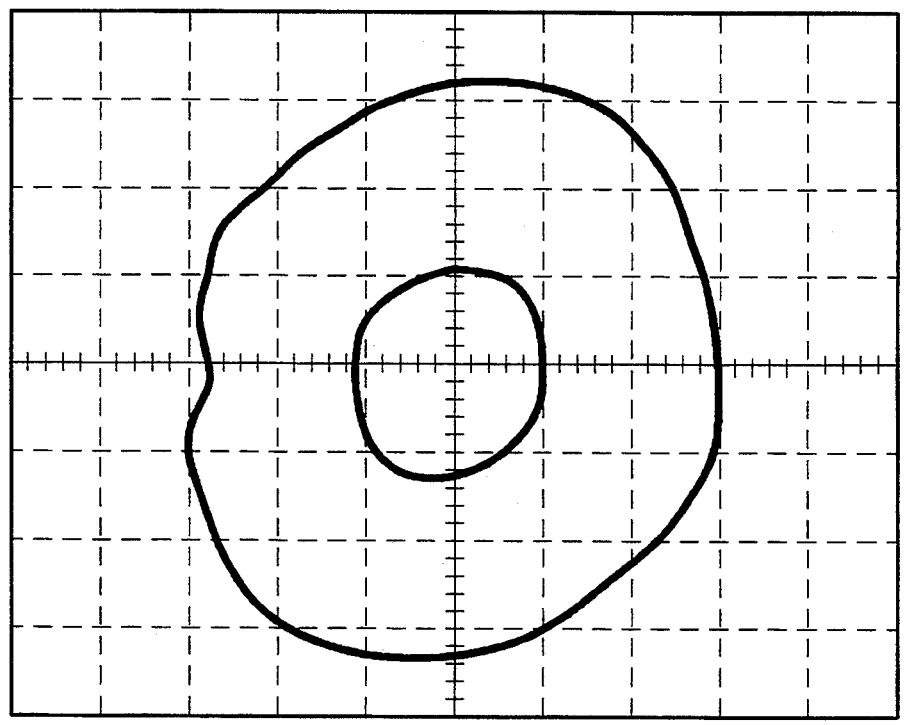
FIG. 27 is a representation of two orbits, with outer one showing rub at approximately 76 microns clearance.

One of the features of using the rotating force field at a low frequency on a stationary rotor is that clearances between the rotor and stationary parts are easily obtained. By using an oscilloscope to observe the orbit, which is the combined pattern of the x-y displacement at whatever probe location desired, then the amplitude of the rotating field perturbing signal is increased until the rotor strikes or rubs the backup bearing or possibly other misaligned components. At this point the orbit deviates from a circular shape and exhibits a flat spot or discontinuity as shown in FIG. 27, which is a photograph of two rotor orbits at the outboard bearing location for two settings of the amplitude of the 500 RPM rotating force field. The inner orbit shows no rubs, but the outer orbit indicates a rub at approximately 76 microns (0.003 in.) clearance with some bounce. The exact angular position of the rub is also available. Then, the bias currents to the electromagnets may be adjusted so that the rotor center line is moved away from the rub location. By now slowly increasing the amplitude of the rotating force field, thus expanding the orbit, new rub locations will appear. Using the approach, the maximum possible orbit and thus maximum clearance may be obtained. This condition may or may not result in the centerline of the rotor being coincident with the centerline of the stator or housing, depending on the alignment accuracy of the overall system components.

There are several rotor dynamics parameters which are quite useful in determining the condition or health of a machine. Of primary importance is certainly the location of critical speeds of a machine in relation to its normal running speed. As seen in several of the previous figures, the critical speeds may be identified on a stationary rotor supported on magnetic bearings by several different diagnostics techniques. The critical speeds observed during an actual runup in rotor speed closely matched those noted during the stationary rotor testing. Structural resonance may also be detected and the stationary rotor in a magnetic bearing could be used as a sensor to monitor attempts to modify or lessen the effects of such a resonance.

The amplification factor is a figure of merit or response sensitivity and gives an indication of how sharp or peaked the maximum amplitude is for a given critical speed. One method of determining this factor is to use the relation, $$A_f = \frac{f_o}{\text{Bandwidth}} = \frac{f_o}{f_2 - f_1}$$

where $f_o$ is the speed or frequency of the peak response and the bandwidth is the $\Delta f$ at the 0.707 points $f_2$ and $f_1$.

The log decrement, $\delta$, defined as the natural logarithm of the ratio of successive amplitudes of a decay of oscillation $$\delta = \frac{1}{n} \ln \frac{x_o}{x_n}$$

where $x_n$ is the amplitude after n cycles have elapsed. The damping ratio, $\xi$, is the ratio of the actual damping coefficient, $c_d$, to the critical damping, $c_c$, $\xi=c_d/c_c$.

The log decrement can be shown to relate to these other parameters by $$\delta \simeq 2\pi\xi = \frac{\pi}{A_f}$$

Thus, by knowing one of these three parameters, the other two may be determined. The critical damping, $c_c$, for a linear second order system is $c_c=2\sqrt{km}=2m\,\omega_n$, where k is the effective stiffness, m is the modal mass and $\omega_n=\sqrt{k/m}$ is the natural frequency of oscillation. The effective stiffness can be either calculated from the control algorithm or obtained form a critical speed map of the machine. Knowing this stiffness and the frequency of the critical from experimental evidence, the modal mass and the critical damping can be calculated. All of these parameters may then be obtained from diagnostic measurement techniques on a stationary rotor and adjusted to fit the overall system requirements before the machine is ever run up in speed. Even though the system response is constantly affected by other higher order criticals, and thus does not behave as an ideal second order system, these parameters mentioned above were calculated from experimental data to at least get approximate values and they are shown in Table 1 for two different settings of the proportional and derivative gains.

The problem of collocation is very important when using magnetic bearings. This concerns the fact that the shaft sensor and the magnetic actuator are generally not in the same plane axially. If one of the rotor mode shapes exhibits a null at a location between the sensor and the actuator, then an instability would result. Thus knowledge of mode shapes for the various rotor resonances or criticals is extremely desirable. Generally, computer programs using matrix transfer theory are run with the appropriate rotor model and the rotor critical speeds, along with the corresponding mode shapes, are determined. Inspection of the mode shape would then reveal whether or not the separation distance of sensor and actuator may be a potential problem.

Figure 28:
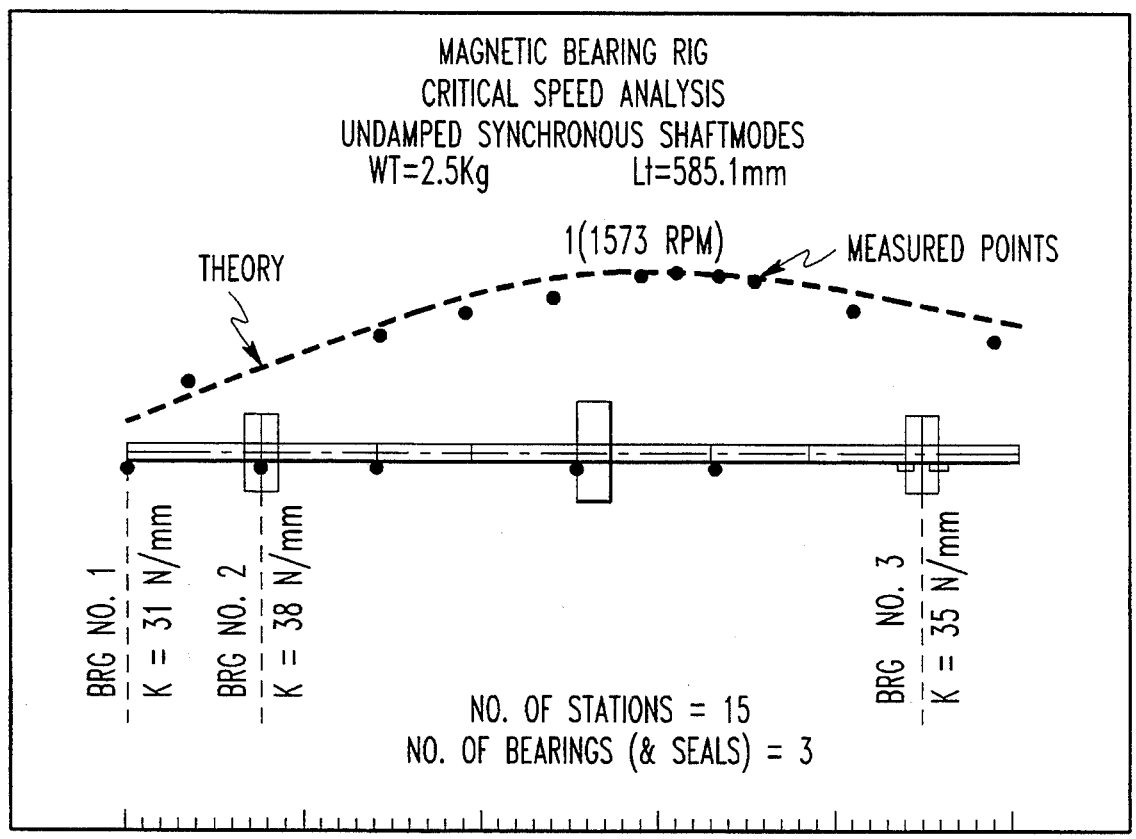
FIG. 28 is a graphical representation of modeshape of a first critical speed of a magnetic bearing rig showing theoretical curve with rotor model and measured points.
Figure 29:
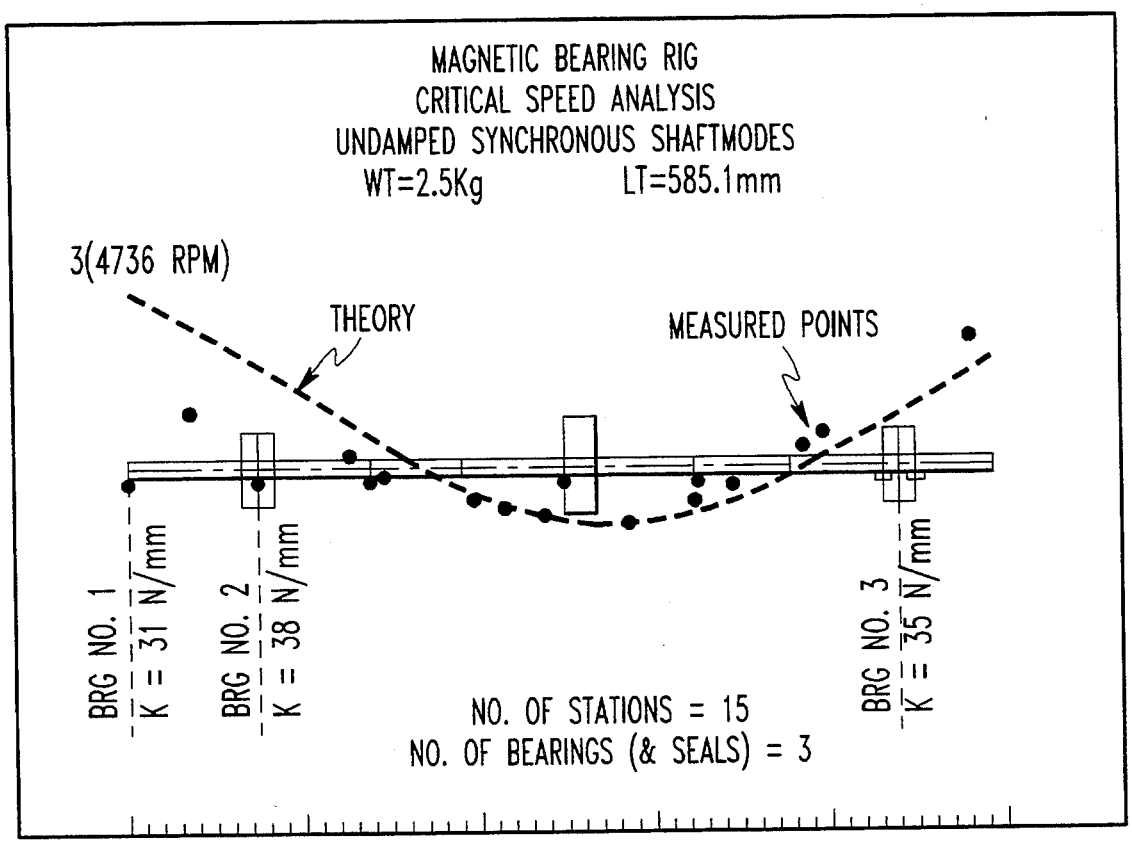
FIG. 29 is a graphical representation of modeshape of a third critical speed of magnetic bearing showing theoretical curve with rotor model and measured points.

Actual measurement of a given mode shape may be accomplished on a magnetic bearing system. By connecting a sine wave of the proper amplitude and frequency, for example, the first critical of a rotor, to the perturbation inputs of the horizontal power amplifiers of both magnetic bearings, then the rotor would vibrate horizontally with the corresponding mode shape. If access to several locations along the axis is available, then by use of another probe, which may be placed at the available locations, the amplitude of vibrations can be recorded and plotted later. FIG. 28 shows the first undamped mode shape generated by a computer program and also actual measured points of amplitude. The magnitude of these points was normalized to the maximum on the computer curve and inspection indicates very close agreement. FIG. 29 gives the same information for the third rotor critical. The ends of the mode shapes deviate somewhat and the actual nodes are slightly separated from the theoretical nodes, but the overall agreement is still close. Thus it is now possible, with a magnetic bearing, to actually measure the mode shapes to check on the theoretical model by experimentally determining the null points to avoid the collocation problem.

Modeshape of third critical of magnetic bearing rig showing theoretical curve with rotor model and measured points.

Another factor which can be measured by use of the sine wave perturbation is cross coupling between axes. Amplitude and phase can be measured on the Y axis for example and compared with the amplitude and phase of the x axis, for a perturbation signal applied to the x direction only. Cross coupling terms introduced by components such as shaft couplings can be examined by performing the measurement with and without the component under investigation.

In summary, diagnostic and control features were experimentally demonstrated on a three mass flexible rotor supported in magnetic bearings similar to the diagnostic sketch of FIG. 1. By using various input perturbation signals, such as white noise, sine wave, step function and a rotating force field, knowledge of characteristics of the magnetic bearing properties and of the overall systems were obtained. Optimal setting of proportional and derivative gains, which control the stiffness and damping, critical speeds, amplitude response, clearance magnitudes, amplification factor, log decrement, damping factor and mode shapes can all be experimentally obtained from the magnetic bearing system before the rotor is run up in speed. Comparison of diagnostic data to data obtained from actual runup information was shown to be very similar.

It will be apparent to those skilled in the art that various modifications and variations can be made in the magnetic bearing system and method of the present invention without departing from spirit or scope of the present invention. Thus, it is intended that the present invention cover the modifications and variations of this invention provided they come within the scope of the claims and their equivalents.

What we claim is:

1. A rotatable machine comprising:
   a housing:
   a rotor having a plurality of masses and a shaft means, wherein the plurality of masses are distributed along the shaft means and included within the masses is at least one shaft portion having a circular peripheral face;
   magnetic bearing means including a plurality of stationary peripherally spaced magnetizable pole pieces mounted to the housing and coacting to support the rotor in a radial direction;
   sensing means for measuring a position of the shaft means relative to a face of each pole piece; and
   a controller for each of the plurality of stationary peripherally spaced magnetizable pole pieces for controlling variable magnetic bearing parameters for changing values of stiffness and damping of the rotor, and for outputting status information relating to a respective pole piece in response to the measurements from the sensing means, and;
   a supervisory controller responsive to the status information of each of the controllers for governing said controllers.

2. The magnetic bearing system of claim 1, wherein the sensing means includes means for detecting rotational speed of the rotor.

3. The magnetic bearing system of claim 1, wherein the sensing means includes means for detecting position of the rotor relative the plurality of stationary peripherally spaced magnetizable pole pieces.

4. The machine of claim 1, wherein the magnetic bearing means includes a plurality of permanent magnets and a plurality of electromagnets without overlap between flux fields of the permanent and electromagnets.

5. A magnetic bearing system comprising:
   a housing;
   an axially extending rotor having a circular peripheral face portion;
   a plurality of angularly spaced magnetizable means, each constituting an axis of control, mounted to the housing, and having pole pieces angularly disposed and opposing the peripheral face portion for suspending the rotor radially from the pole pieces, said suspending rotor having stiffness and damping characteristics in accordance with a control signal that varies respective flux strength of the plurality of angularly spaced magnetizable means;
   sensing means for detecting selected parameters of the rotor;
   a direct controller for each axis of control, each direct controller including means for sampling a detected parameter a selected plurality of times during each revolution of the rotor and for outputting a control signal in accordance with and corresponding to the sampled parameter;
   the direct controllers being interconnected for providing each direct controller with the sampled parameters and output control signals of other direct controllers; and
   a supervisory controller including means governed by each of the direct controllers for reconfiguring the direct controllers among the plurality of control axes at times when a sampled parameter indicates a malfunction of one of the direct controllers.

6. The magnetic bearing system of claim 5, wherein means for outputting a control signal for each control axis includes means for performing a plurality of multiply/accumulate operations between each sampled parameter.

7. The magnetic bearing system of claim 4, wherein each control processor includes a clock generator for clocking sample rates independent of other control processors.

8. The magnetic bearing system of claim 5, wherein each direct controller includes a timing device for interrupting control by the supervisory controller upon the termination of successive predetermined periods of time, unless said timing device is preset within each such successive period, and means responsive to the interrupting for determining the malfunction of a corresponding direct controller.

9. The magnetic bearing system of claim 5, wherein each of the magnetizable means includes an electromagnet for each control axis, and further comprises a plurality of angularly spaced stationary permanent magnets disposed to eliminate overlapping of respective flux fields of the electromagnets.

10. The magnetic bearing system of claim 5, wherein each direct controller includes means for sampling the detected parameters and for outputting a control signal for every other axis of control.

11. The magnetic bearing system of claim 5, wherein the direct controllers each have a serial bus for interconnection with other direct controllers, each bus having independent clock and data signals.

12. The magnetic bearing system of claim 11, wherein each direct controller includes means for commencing an A/D conversion cycle at the beginning of each sampling period, means for broadcasting serial data and clock outputs from each A/D converter over a corresponding serial bus during each conversion cycle for providing each direct controller with a result of the A/D conversion cycle of every other direct controller.

13. A method of controlling parameters of a rotor in a magnetic bearing having a plurality of electromagnets angularly disposed and opposing a peripheral circular face portion of the rotor, wherein the rotor is radially suspended in accordance with a flux strength of the plurality of electromagnets, and wherein each of the plurality of electromagnets constitutes a control axis for the rotor, the method comprising:
sensing selected parameters of the rotor;
sampling the selected parameters a plurality of times during each revolution of the rotor; processing the sampled parameters separately for each control axis to provide a corresponding output control signal for a respective control axis;
communicating the sampled selected parameters and output control signals for each control axis to; others of the plurality of electromagnets; and
combining the processing of more than one axis in response to the sampled parameters for calculating the output control signals at times when the processing for one of the control axes malfunctions.

14. The method of claim 13, wherein the processing of each sampled parameter is effected prior to the sampling of each successive parameter.

15. The method of claim 13, wherein the step of sampling includes sampling the selected parameters at a rate to control vibrations at approximately 7 times running speed.

16. The method or claim 13, wherein the step of processing the sampled parameters includes commencing an A/D conversion cycle at the beginning of each sampling period for each direct controller, broadcasting serial data and clock outputs during each conversion cycle for providing each controller a result of the A/D conversion cycle of every other direct controller.

17. The method of balancing a rotor supported by radial magnetic bearings comprising the steps of:
(a) suspending the rotor spaced from the magnetic bearings;
(b) superimposing an electrical signal on the magnetic bearings, wherein the electrical signal rotatably sweeps through a frequency range which includes critical speeds of the rotor;
(c) detecting motion of the rotor that results from superimposition of this rotating field with bearing
(d) ascertaining unbalance of the rotor from influence coefficients obtained by mathematical manipulation of this rotating field and the motion as detected by bearing sensors; and
(e) balancing the rotor in response to said ascertained unbalance.

18. The method of claim 17, including the step of maintaining the rotor in a stationary non-rotating position during the step of superimposing the electrical signal.

19. The method of claim 17, wherein the rotor is in a state of turning during the step of superimposing the electrical signal.

20. The method of claim 17, wherein the step of superimposing the electrical signal, comprises oscillating the signal in a radial direction across an axis of the rotor to produce a force to act upon the rotor, and measuring displacement response of the rotor in a direction perpendicular to the direction of the oscillating force; and the method further comprises determining a cross-coupling of the rotor by calculating a ratio of the force to the displacement.

21. The method of claim 17 wherein the step of balancing the rotor comprises electrically balancing the rotor with the rotatable superimposed electrical signal having an amplitude, phase, and frequency in accordance with the ascertained unbalance.

22. A rotatable machine comprising:
a housing;
a rotor having a plurality of masses and a shaft means, wherein the plurality of masses are distributed along the shaft means and included within the masses is at least one shaft portion having a circular peripheral face;
magnetic bearing means including a plurality of stationary peripherally spaced magnetizable pole pieces mounted to the housing and coacting to support the rotor in a radial direction;
sensing means for measuring a position of the shaft means relative to a face of each pole piece; and
at least one controller for controlling variable magnetic bearing parameters of the plurality of stationary peripherally spaced magnetizable pole pieces in concert with one another and coacting with one another, and for outputting status information relating to the plurality of stationary peripherally spaced magnetizable pole pieces in response to the measurements from the sensing means.

23. A method of determining rotor parameters of a magnetic bearing having a plurality of electromagnets angularly disposed and opposing a peripheral circular face portion of a rotor wherein the rotor is radially suspended in accordance with flux strength of the plurality of electromagnets and the rotor is in a stationary non-rotating condition, the method comprising:

superimposing a perturbation signal on the plurality of electromagnets;
  varying the perturbation signal through selected values;
  sensing a position of the nonrotating suspended rotor local to each of the plurality of electromagnets in accordance with the perturbation signal; and
  determining a selected dynamic response of the non-rotating suspended rotor in accordance with a sensed position of the rotor.

24. The method of claim 23 wherein the step of superimposing the perturbation signal comprises superimposing a constant amplitude rotating electrical field having a variable frequency.

25. The method of claim 23 wherein the step of superimposing the perturbation signal comprises superimposing a white noise signal containing a plurality of frequencies for modifying current and magnetic fields supporting the rotor.

26. The method of claim 23 wherein the step of superimposing the perturbation signal comprises superimposing a sine wave on each of the plurality of angularly disposed electromagnets.

27. The method of claim 23 wherein the step of superimposing the perturbation signal comprises superimposing a low frequency square wave signal.

28. The method of claim 24 wherein the step of superimposing the rotating field includes varying the frequency between approximately five and twenty Hertz for moving the rotor in an orbiting non-rotating path until it strikes a non-rotatable element to determine radial clearance of the magnetic bearing.

29. The method of claim 23 wherein the step of superimposing the perturbation signal comprises superimposing a varying amplitude rotating electrical field for obtaining maximum radial clearance for all rotational positions of the rotor.

30. The method of claim 23 wherein the step of superimposing the perturbation signal comprises applying a sine wave of predetermined amplitude and frequency for vibrating the rotor horizontally; and further comprises the step of determining mode shape of the rotor at a critical speed.

* * * * *

UNITED STATES PATENT AND TRADEMARK OFFICE
CERTIFICATE OF CORRECTION

PATENT NO. : 5,347,190
DATED : September 13, 1994
INVENTOR(S) : David W. Lewis, et al.

It is certified that error appears in the above-indentified patent and that said Letters Patent is hereby corrected as shown below:

Claim 7, column 53, line 8, before "control" insert --direct--.

Claim 13, column 53, line 56, delete ";".

Claim 16, column 54, line 3, change "or" to --of--.

Claim 17, column 54, line 19, after "bearing" insert --sensors;--.

Signed and Sealed this

Twenty-fifth Day of April, 1995

Attest:

BRUCE LEHMAN

*Attesting Officer*    *Commissioner of Patents and Trademarks*